(12) United States Patent
Miki et al.

(10) Patent No.: US 7,470,139 B2
(45) Date of Patent: Dec. 30, 2008

(54) TRANSCEIVER MODULE

(75) Inventors: Yasuyuki Miki, Shinagawa (JP); Osamu Daikuhara, Shinagawa (JP); Yasuhiko Furuno, Shinagawa (JP); Hideo Miyazawa, Shinagawa (JP); Koichi Kiryu, Shinagawa (JP); Tohru Yamakami, Shinagawa (JP); Shigeyuki Takizawa, Shinagawa (JP); Toshihiro Kusagaya, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 638 days.

(21) Appl. No.: 11/189,828

(22) Filed: Jul. 27, 2005

(65) Prior Publication Data
US 2006/0116084 A1 Jun. 1, 2006

(30) Foreign Application Priority Data
Nov. 26, 2004 (JP) ............... 2004-342117
May 20, 2005 (JP) ............... 2005-147790

(51) Int. Cl.
*H01R 13/627* (2006.01)
(52) U.S. Cl. ............................................... 439/354

(58) Field of Classification Search ............. 439/354, 439/358, 357, 352–353, 608
See application file for complete search history.

(56) References Cited

U.S. PATENT DOCUMENTS

| | | | | |
|---|---|---|---|---|
| 6,315,590 | B1 * | 11/2001 | Grois et al. | 439/248 |
| 6,540,543 | B1 * | 4/2003 | Watanabe | 439/354 |
| 6,953,361 | B2 * | 10/2005 | Li et al. | 439/358 |

* cited by examiner

*Primary Examiner*—Jean F Duverne
(74) *Attorney, Agent, or Firm*—Staas & Halsey LLP

(57) ABSTRACT

A transceiver module for mounting to an information processing apparatus is disclosed. The transceiver module includes a housing including a cover part provided at a front side of the transceiver module, a data transmission/reception part mounted to the housing, the data transmission/reception part, a connector installed in the cover part of the housing, and a latch mechanism including an engagement pawl part engaged with the housing, the engagement pawl part including a first cam part, a spring member urging from the housing and abutting the engagement pawl part in a first width direction of the transceiver module, and a pull sleeve having a second cam part for pressing against the first cam part when the pull sleeve is pulled in a longitudinal direction of the transceiver module.

13 Claims, 22 Drawing Sheets

FIG.15
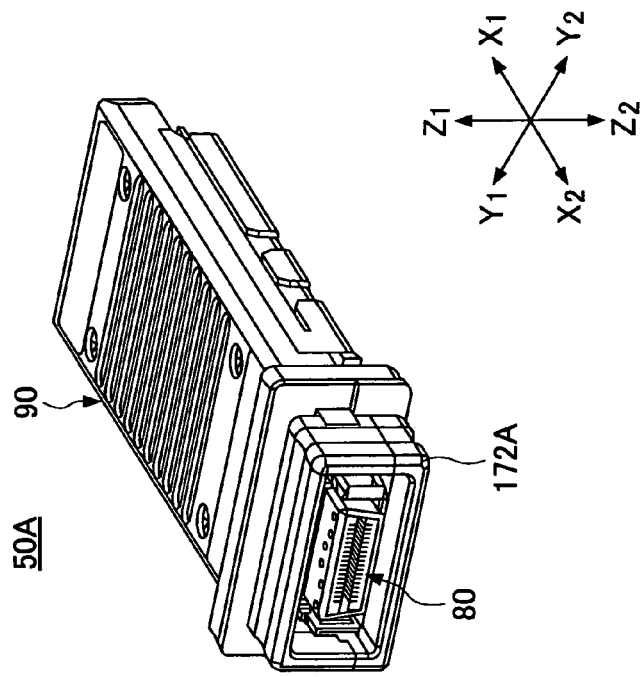
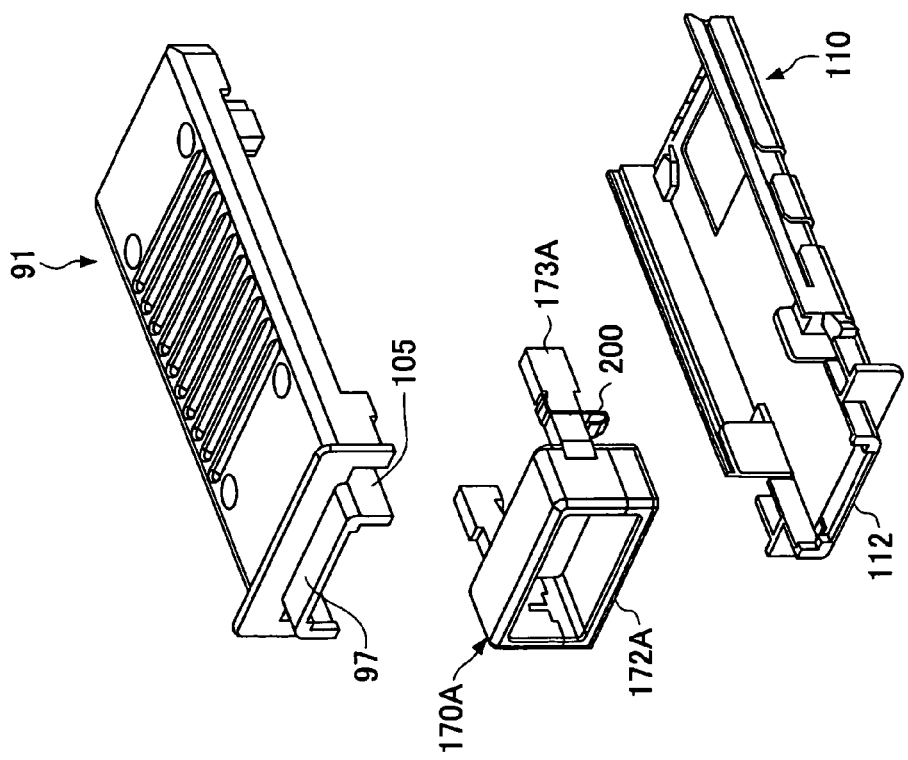

TRANSCEIVER MODULE

BACKGROUND OF THE INVENTION

1. Field of the Invention

The present invention generally relates to a transceiver module, and more particularly to a transceiver module being mounted to an information processing apparatus and having functions for transmitting and receiving data.

2. Description of the Related Art

Among various types of LANs (Local Area Network), there is a bus type LAN referred to as an Ethernet (Registered Trademark) LAN. The Ethernet (Registered Trademark) LAN is configured by setting a server apparatus (information processing apparatus) for transmitting and receiving data and connecting the server apparatus to a signal transmission path(s). The size of a system such as this LAN varies depending on the user, in which one may have a long data transmission length of several tens of kilometers and another may have a short data transmission length of only several tens of meters. Accordingly, transceiver modules, having functions for transmitting and receiving data, are provided to the server apparatus in correspondence with the various transmission distances. The server apparatus includes transceiver module mounting parts to which the various transceiver modules are mounted. In a case, for example, where the length of the transmission path is altered, one of the transceiver modules are removed from the transceiver module mounting parts and replaced with another transceiver module. In order to allow the transceiver modules of different types to be mounted to the transceiver module mounting parts, that is, to provide compatibility with other transceiver modules, the transceiver modules are to comply with various standards.

One standard is to have an engagement claw, which projects from a side face of the transceiver module, to be retracted into a housing when a pull sleeve surrounding a connector is pulled.

FIG. 1A shows a state of a transceiver module 10 mounted to a server apparatus 20 by having the transceiver module 10 inserted into a transceiver module mounting part 21 in direction X1. FIG. 1B shows a state of pulling out the transceiver module 10 from the transceiver module mounting part 21 of the server apparatus 20.

In the drawings, numeral 11 indicates a housing of the transceiver module 10, numeral 12 indicates a pull sleeve, numeral 12a is a wedge part, and numeral 13a indicates an engagement claw. The wedge part 12a, situated inside a space part 11a in the housing 11, forms a united body with the pull sleeve 12. The engagement claw 13a having a triangular shape is formed by bending an end part of a planar spring member 13. The planar spring member 13 is bent in a U-letter shape in the space part 11a and is latched to an engagement opening 21a of the transceiver module mounting part 21 by having the engagement claw 13a projecting from a side plane of the housing 10. One end of the transceiver module 10 toward direction X2 is connected to a cable connector (not shown).

When the pull sleeve 12 is pulled toward direction X2 as shown in FIG. 1B, the wedge part 12a pushes the engagement claw 13a and bends the planar spring member 13, such that the engagement claw 13a is retracted into the housing 11. Thus, the latched state between the planar spring member 13 and the engagement opening 21a is released. Thereby, the transceiver module 10 is pulled out from the server apparatus 20.

With reference to FIGS. 2A and 2B, the strength at a root part 13b of the engagement claw 13a tends to be weak since the engagement claw 13a is formed by bending a part of the planar spring member 13. For example, in a case where the cable connector is accidentally pulled, an edge of the engagement opening 21a abuts one end of the engagement claw 13a, to thereby apply a force F1 to the engagement claw 13a (See FIG. 2A). Accordingly, as shown in FIG. 2B, a moment M1 is created in a counterclockwise direction with respect to the root part 13b, thereby the engagement claw 13a is bent at the fragile root part 13b. This causes insufficiency of the latched state between the planar spring member 13 and the engagement opening 21a.

SUMMARY OF THE INVENTION

It is a general object of the present invention to provide a transceiver module that substantially obviates one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by a transceiver module particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides a transceiver module for mounting to an information processing apparatus, the transceiver module including: a housing including a cover part provided at a front side of the transceiver module; a data transmission/reception part mounted to the housing, the data transmission/reception part including a contact part provided at a rear side of the transceiver module; a connector installed in the cover part of the housing; and a latch mechanism including an engagement pawl part engaged with the housing, the engagement pawl part including a first cam part; a spring member urging from the housing and abutting the engagement pawl part in a first width direction of the transceiver module, and a pull sleeve having a second cam part for pressing against the first cam part when the pull sleeve is pulled in a longitudinal direction of the transceiver module; wherein the engagement pawl part is configured to move in a second width direction of the transceiver module when the second cam part of the pull sleeve presses against the first cam part of the engagement pawl part.

In the transceiver module according to an embodiment of the present invention, the first cam part may be situated at a part of the engagement pawl part toward the front side of the transceiver module.

In the transceiver module according to an embodiment of the present invention, the latch mechanism may further include another spring member for returning the pull sleeve to an original position when the pull sleeve is pulled.

In the transceiver module according to an embodiment of the present invention, the latch mechanism may further include another engagement pawl part having another first cam part, wherein the pull sleeve further includes another second cam part corresponding to the other first cam part, wherein the engagement pawl part and the other engagement pawl part are situated at the side planes of the housing.

In the transceiver module according to an embodiment of the present invention, the housing further includes a plurality of heat releasing fins that are provided on an upper plane of the housing, and a plurality of connection parts that surround the plural heat releasing fins on the upper plane of the housing.

In the transceiver module according to an embodiment of the present invention, the pull sleeve may include a pull sleeve part having an inverted U-letter shape and a lower metal plate member situated between the ends of the pull sleeve part.

In the transceiver module according to an embodiment of the present invention, the housing may include a combination of an upper half housing part and a lower half housing part, wherein the combination is configured to restrict movement of the connector in the housing with respect to the height and longitudinal directions of the transceiver module.

In the transceiver module according to an embodiment of the present invention, a gasket may be provided between an upper plane of the connector and the upper half housing part and between a lower plane of the connector and the lower half housing part.

In the transceiver module according to an embodiment of the present invention, a heat releasing sheet may be provided between an upper plane of the data transmission/reception part and a lower plane of the upper half housing part, wherein a plurality of projecting parts are provided on the lower plane of the upper half housing part in a manner facing the heat releasing sheet.

Furthermore, the present invention provides a transceiver module for mounting to an information processing apparatus, the transceiver module including: a housing including a cover part provided at a front side of the transceiver module; a data transmission/reception part mounted to the housing, the data transmission/reception part including a contact part provided at a rear side of the transceiver module; a connector installed in the cover part of the housing; and a latch mechanism including a pull sleeve having a rod part and a planar shield member engaged to the rod part; wherein the planar shield member has a size corresponding to an opening in the housing for inserting the rod part therethrough.

In the transceiver module according to an embodiment of the present invention, the planar shield member may include a U-shaped planar spring part, wherein the U-shaped planar spring part is configured to return the pull sleeve to an original position when the pull sleeve is pulled.

In the transceiver module according to an embodiment of the present invention, the rod part may include a slit part and a core part provided at a far end of the slit part, wherein the planar shield member includes a projecting part and a notch, wherein the notch is mounted to the core part by pressing the projecting part into the slit part.

In the transceiver module according to an embodiment of the present invention, a plurality of gaskets may be provided on an upper plane and a lower plane of the housing toward the front side of the transceiver module, wherein the plural gaskets are metal spring-type gaskets, wherein the plural gaskets are configured to abut an edge part of an insertion port of the information processing apparatus when the transceiver module is inserted in the insertion port of the information processing apparatus.

In the transceiver module according to an embodiment of the present invention, a plurality of cylindrical gaskets may be provided on the side planes of the housing toward the front side of the transceiver module, wherein the plural gaskets are configured to abut an edge part of an insertion port of the information processing apparatus when the transceiver module is inserted in the insertion port of the information processing apparatus.

Other objects and further features of the present invention will be apparent from the following detailed description when read in conjunction with the accompanying drawings.

BRIEF DESCRIPTION OF THE DRAWINGS

FIG. 15 is a schematic drawing for showing a perspective view along with an exploded view of a transceiver module according to a second embodiment of the present invention;

DESCRIPTION OF THE PREFERRED EMBODIMENTS

In the following, embodiments of the present invention will be described with reference to the accompanying drawings.

First Embodiment

Description of Server Apparatus and Transceiver Module

Figure 1A:
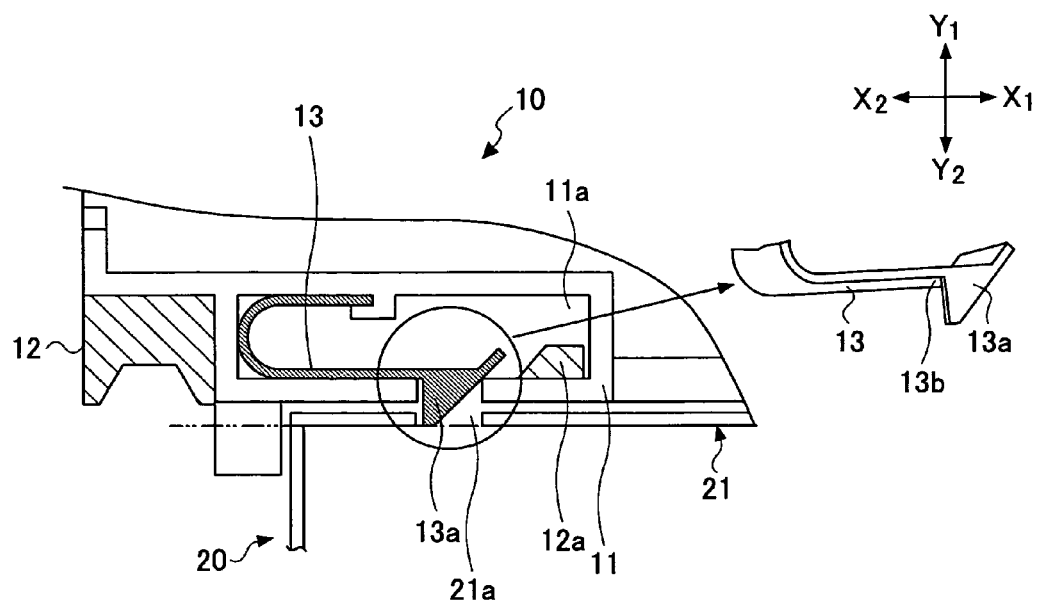
FIGS. 1A and 1B are drawings for describing a conventional latch mechanism in mounting a transceiver module mounted to a server apparatus.
Figure 1B:
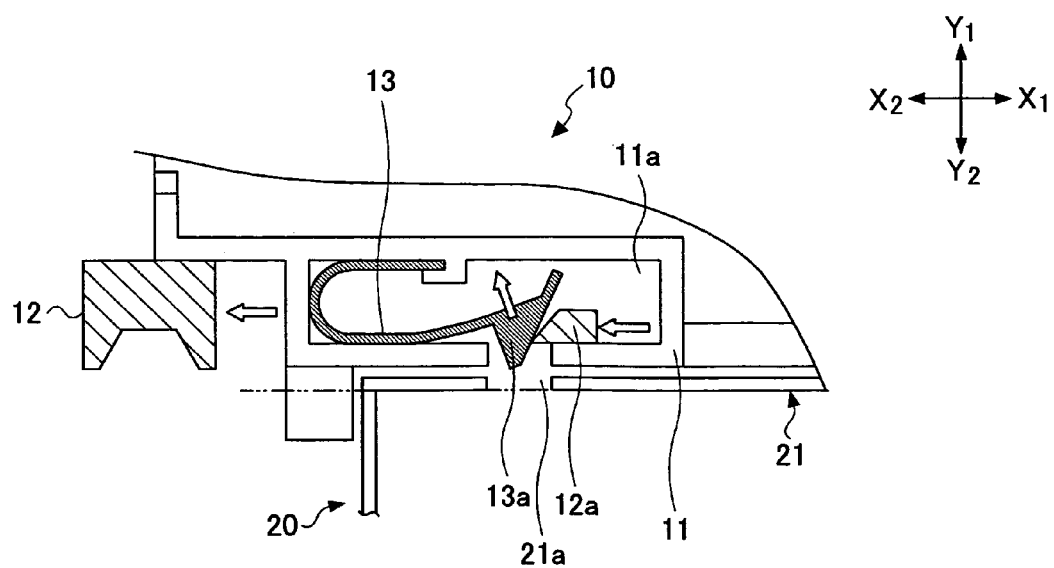
Figure 2A:
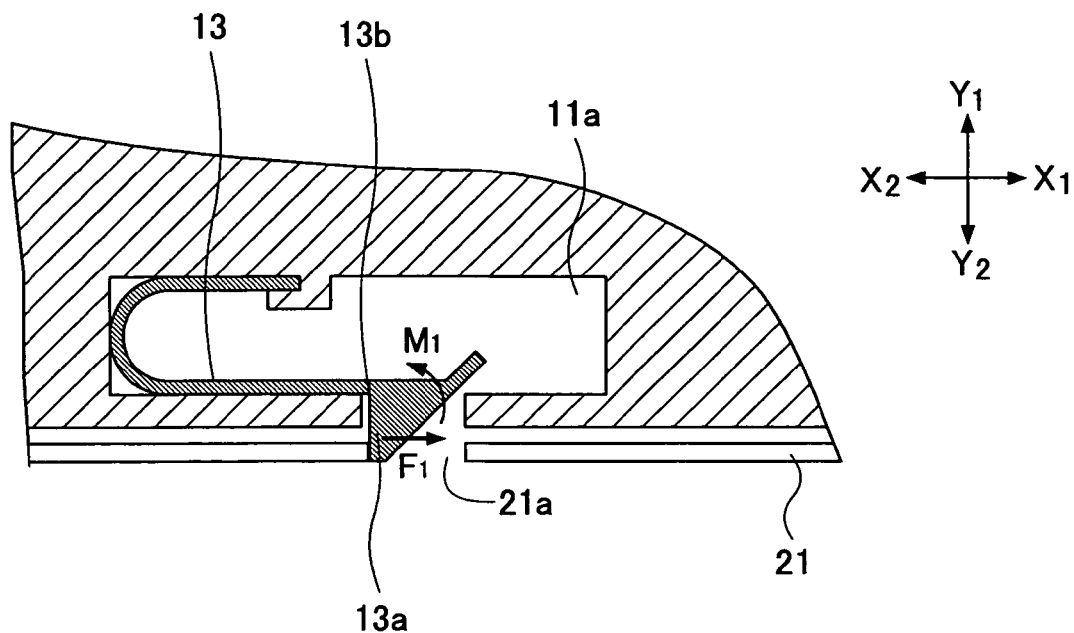
FIGS. 2A and 2B are drawings for describing the problems of the latch mechanism shown in FIGS. 1A and 1B.
Figure 2B:
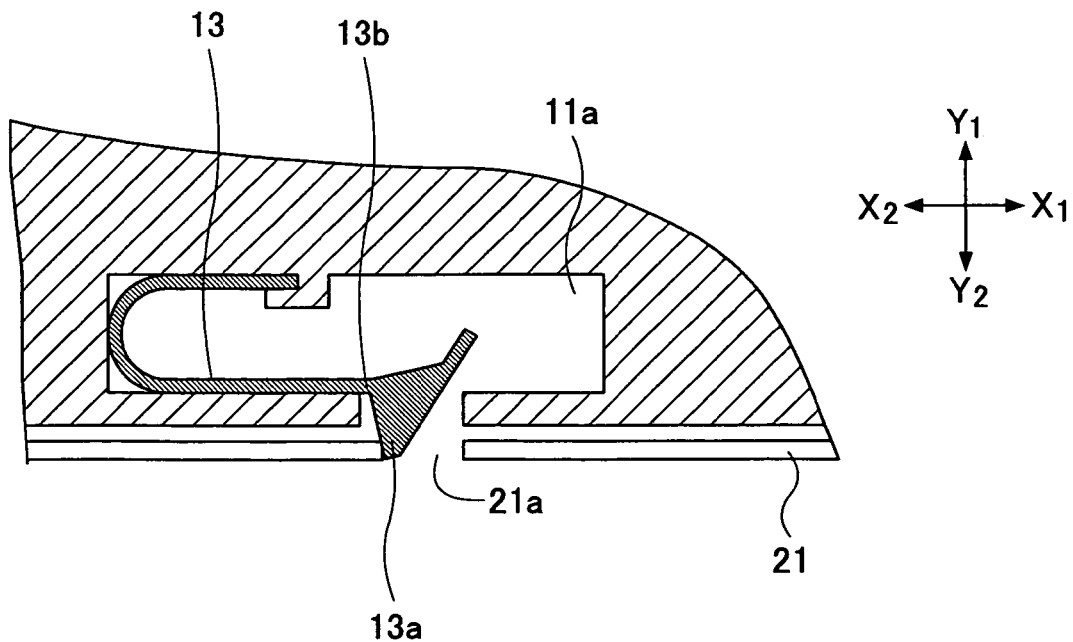
Figure 3:
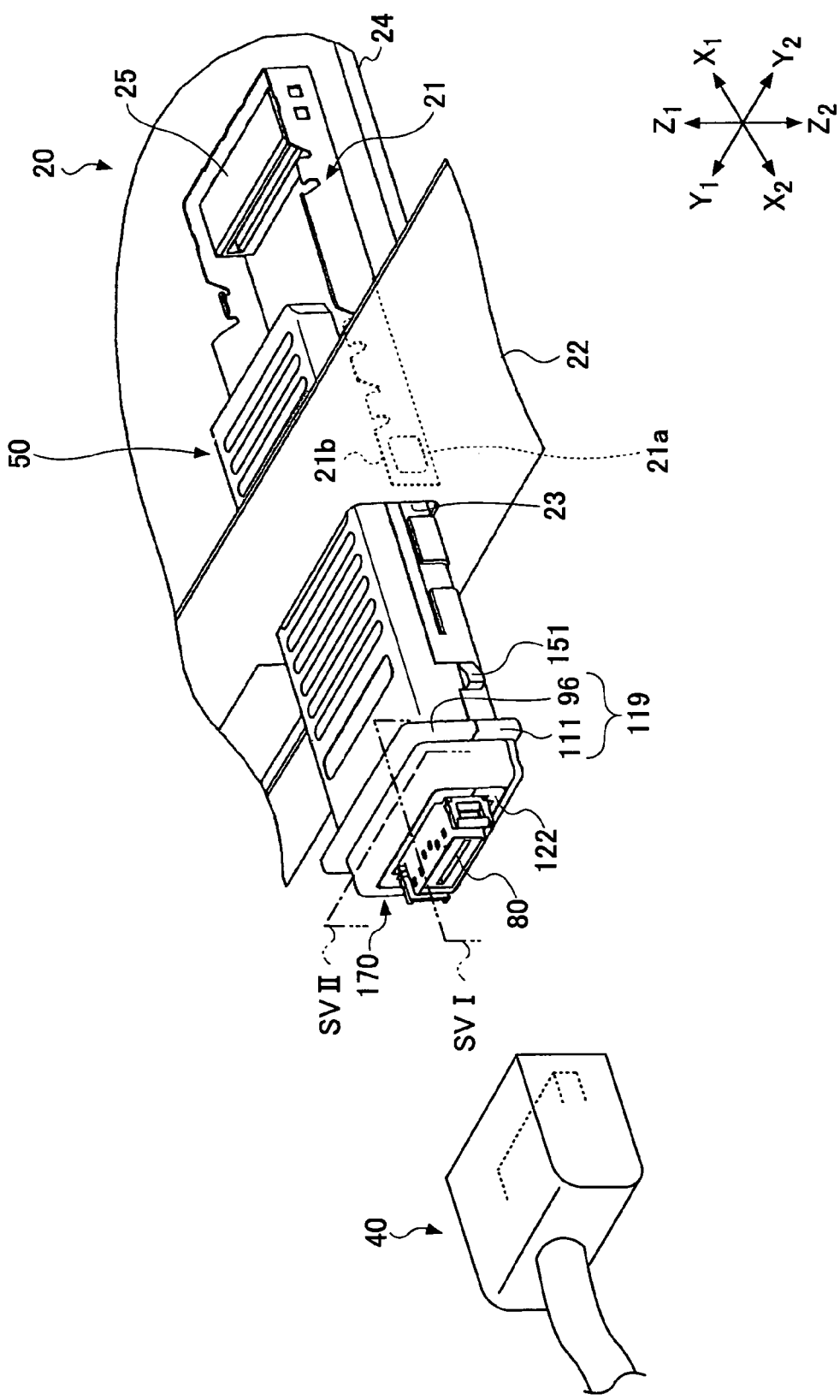
FIG. 3 is a perspective view showing a transceiver module according to a first embodiment of the present invention.
Figure 4:
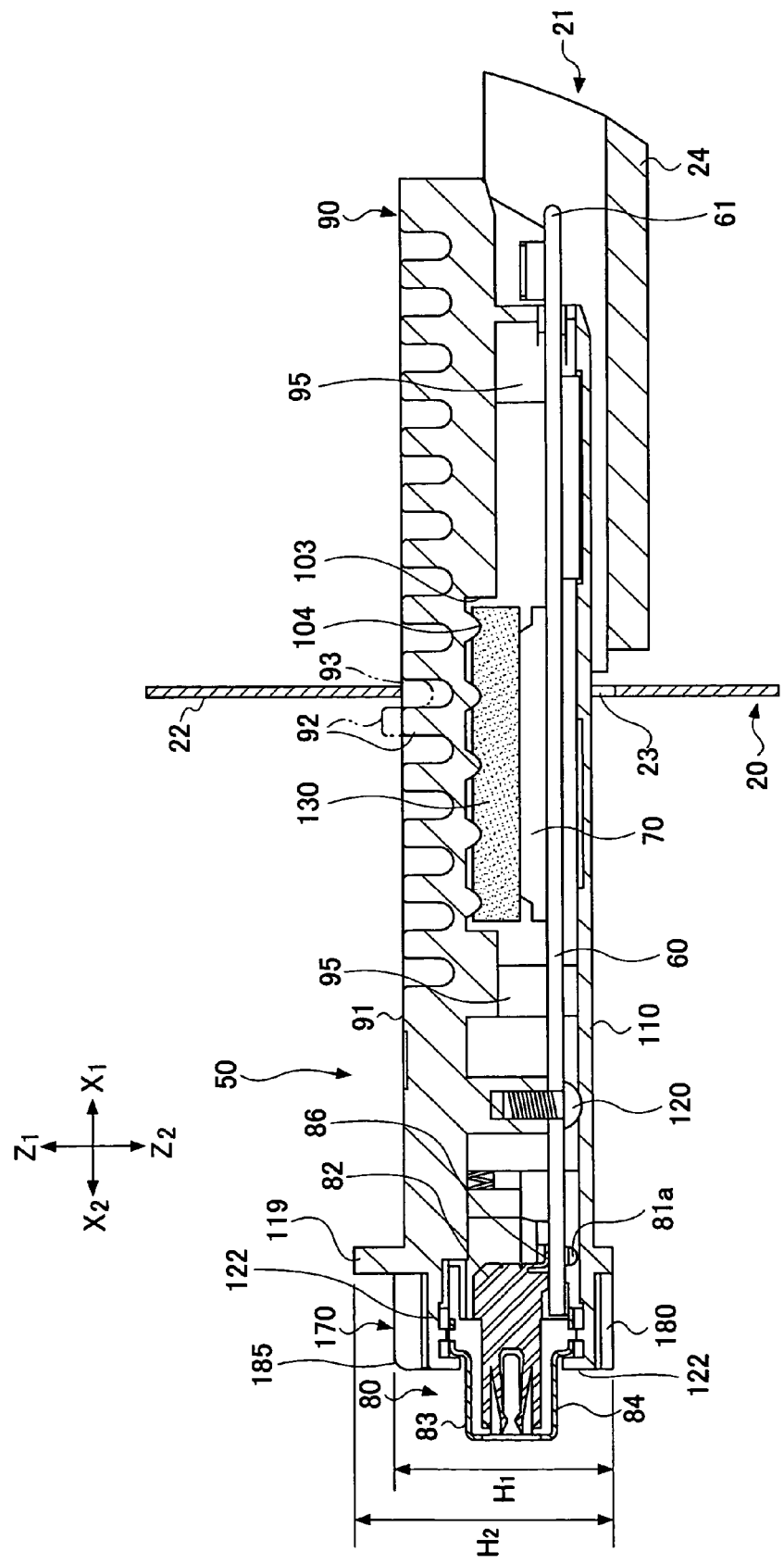
FIG. 4 is a cross-sectional view of the transceiver module shown in FIG. 3.

FIGS. 3 and 4 are drawings showing a transceiver module 50 in the middle of being mounted to a mounting base part (transceiver module mounting base part) 21 of a server apparatus (information processing apparatus) 20 according to the first embodiment of the present invention.

In FIGS. 3 and 4, arrows X1-X2 indicate the longitudinal direction of the transceiver module 50 (depth direction of the server apparatus 20), arrows Y1-Y2 indicate the lateral direction of the transceiver module 50 (width direction of the server apparatus 20), and arrows Z1-Z2 indicate the height (thickness) direction of the transceiver module 50 (height direction of the server apparatus 20). The direction toward arrow X2 is the front side of the transceiver module 50 and the direction toward arrow X1 is a direction for inserting the transceiver module 50 into an insertion port 23 of the server apparatus 20.

The server apparatus 20 includes one or more insertion ports 23 (one insertion port 23 is illustrated in FIG. 3) provided at a front panel 22 thereof. A mounting base part 21, to which the transceiver module 50 is mounted, is provided in the server apparatus 20. The mounting base part 21 has a substantially U-letter shape facing the insertion port 23. The mounting base part 21 is mounted on a motherboard 24. The mounting base part 21 is formed with a box-like shape in which a top face (face toward the Z1 direction) thereof is open. The sides of the mounting base part 21 are provided with engagement openings 21a. Furthermore, the upper edges of the sides of the mounting base part 21 are provided with guide rail parts 21b. In the deep end part (toward the X1 direction) of the mounting base part 21A, a connector 25 for interface connection is connected to an interface of the server apparatus 20.

Figure 5:
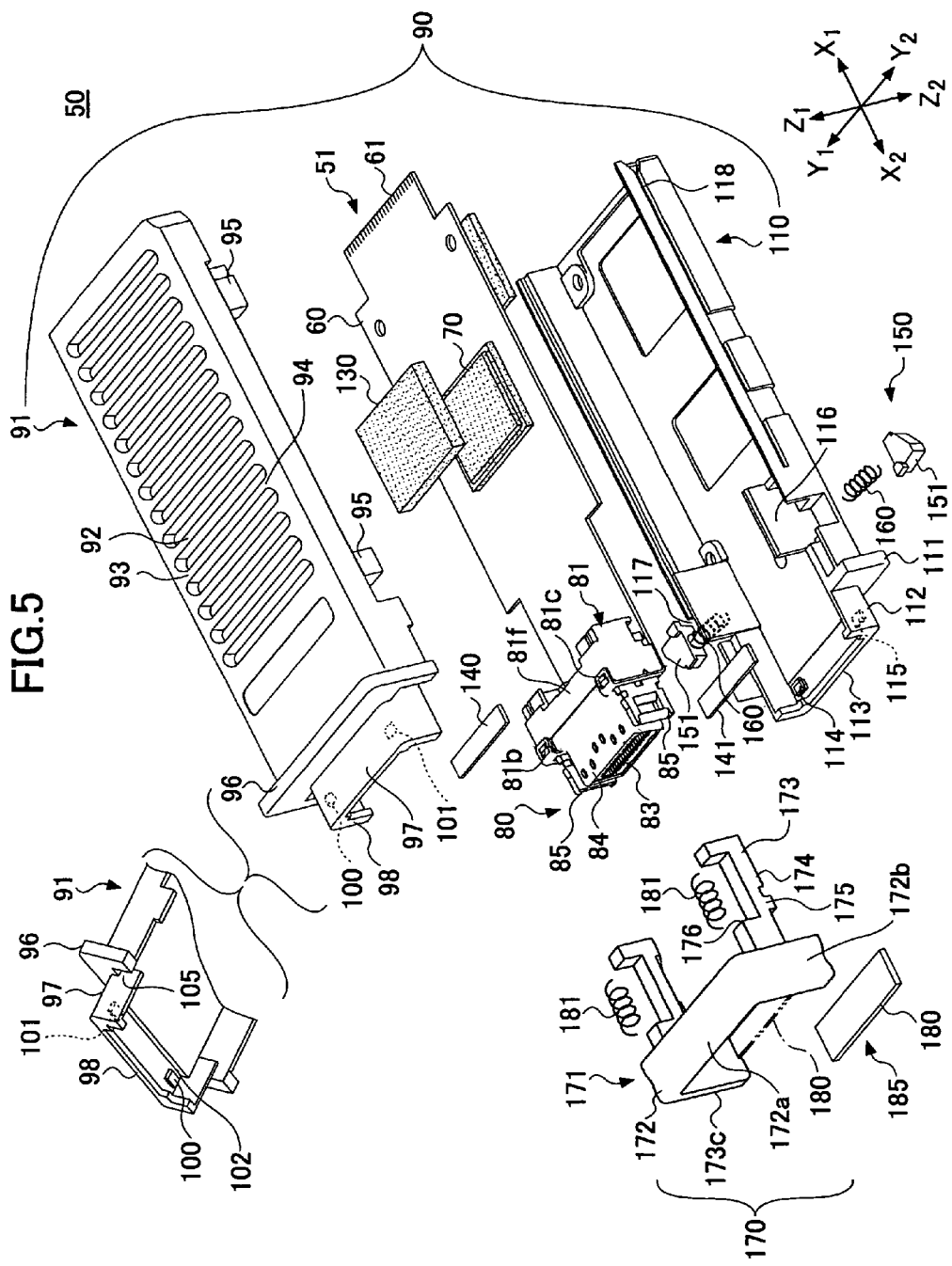
FIG. 5 is an exploded perspective view of the transceiver module shown in FIG. 3.

With reference to FIGS. 4 and 5, the transceiver module 50 has a rectangular parallelepiped body elongated in directions X1-X2. The transceiver module 50 includes a module housing 90 that houses a data communication assembly 51 therein. The data communication assembly 51 has a card edge contact part 61 provided in the X1 direction. The transceiver module 50 also includes a pull sleeve 170 and a connector (connector plug for balanced transmission) 80 which are both provided in the X2 direction. Although the communication distance of the transceiver module 50 may be restricted to a short distance since it uses the connector plug 80 for balanced transmission, such use allows high speed communication of a maximum transmission rate of 10 G bits and thus complies with the specifications of Ethernet (registered trademark). The transceiver module 50 is inexpensive since no opto-electric converting part is provided thereto.

The server apparatus 20 may be applied, for example, to a system performing high speed communication at short communication distances. The transceiver module 50 is mounted to the server apparatus 20 by inserting the transceiver module 50 into the insertion port 23 in the X1 direction along the mounting base part 21, and connecting (latching) the card edge contact part 61 to the connector 25. When the transceiver module 50 is mounted to the server apparatus 20, the connector plug 80 is in a state protruding from the front panel 22 of the server apparatus 20.

The server apparatus 20 (having the transceiver module 50 mounted thereto) can be connected to a cable connector (cable connector for balanced transmission) 40 extending from another device by engaging the cable connector 40 to an engagement opening part(s) 85 (described below) of the connector plug 80. Accordingly, a short distance high-speed communication system can be constructed. Since the manufacturing cost of the transceiver module 50 is inexpensive, such short distance high speed communication system can be obtained at a lower cost compared to a conventional system.

Configuration of Transceiver Module (Except for Latch Mechanism)

Figure 6:
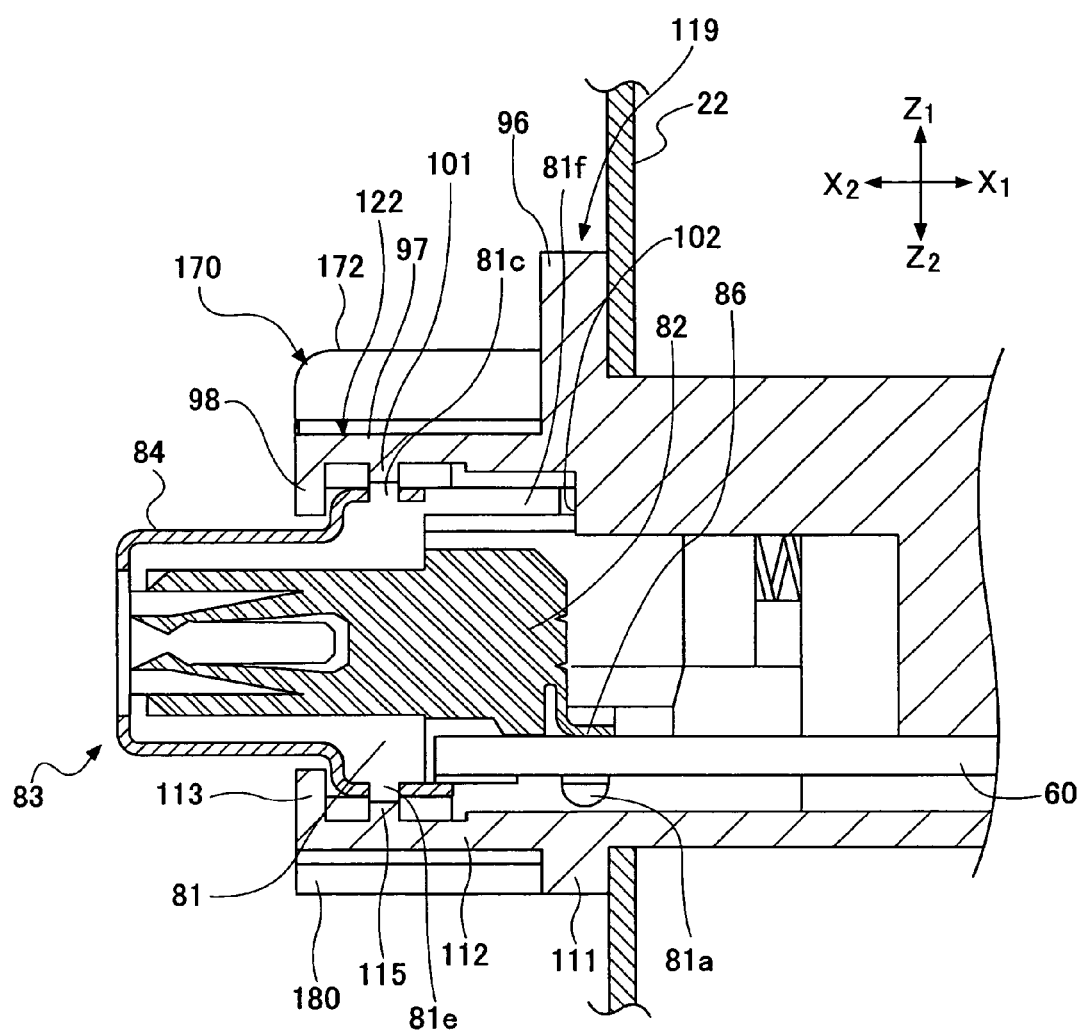
FIG. 6 is an enlarged cross-sectional view of a front side part of the transceiver module taken along line SVI in FIG. 3.
Figure 7:
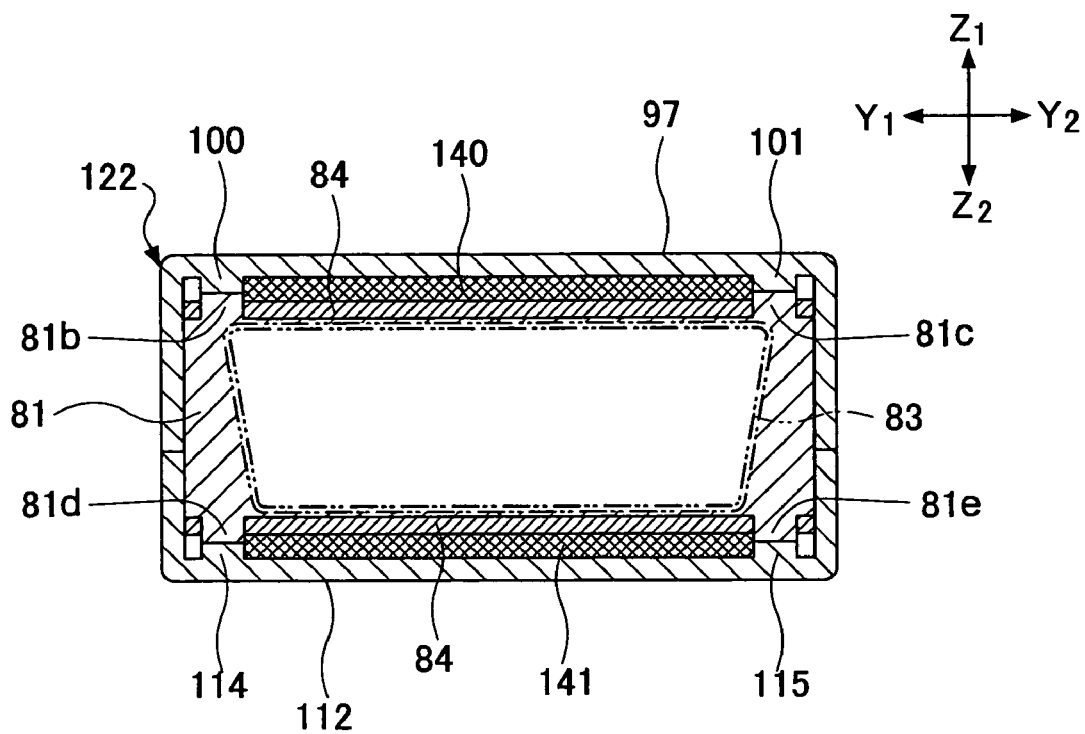
FIG. 7 is an enlarged cross-sectional view of a front side part of the transceiver module taken along line SVII in FIG. 3.

FIG. 5 is an exploded view of the transceiver module 50. FIG. 6 is an enlarged cross-sectional view taken along a plane SVI in FIG. 3. FIG. 7 is an enlarged cross-sectional view taken along a plane SVII in FIG. 3.

In the data communication assembly 51, an LSI (semiconductor package) 70 is mounted at a center of a printed board 60. Furthermore, the connector plug 80 is situated at an end part of the printed board 60 toward direction X2. Furthermore, the card edge contact part 61 provided with an alignment of terminals is situated at the other end part of the printed board 60 toward direction X1. The LSI (semiconductor package) 70 includes a function for transmitting and receiving data. The LSI (semiconductor package) 70 has a bottom plane of a ball grid array of terminals that is to be mounted on the surface of the printed board 60.

Multiple pairs of positive signal terminals and negative signal terminals (not shown), which have a grand terminal 82 provided therebetween, are aligned in a plug housing (insulating plug housing) 81 of the connector plug 80. A plug part 83 is provided in the connector plug 80 toward direction X2 and has its periphery covered by a shield member 84. Furthermore, engagement opening parts 85 are provided in the connector plug 80 toward directions Y1 and Y2. The connector plug 80 is fixed in a manner having a part of the plug housing 81 supported on the printed board 60, having a leg part 81a of the housing 81 fitted to a hole in the printed board 60, and having a terminal part(s) 86 (aligned toward direction X2) soldered to a corresponding terminal part(s) of the printed board 60. There are 16 pairs of terminals, in which 8 pairs are provided for reception of data and the remaining 8 pairs are provided for transmission of data.

The plug housing 81 includes protruding parts 81b and 81c disposed at both sides of its upper plane, protruding parts 81d and 81e disposed at both sides of its bottom plane, and an overhang part 81f disposed at its upper plane toward direction X1.

As show in FIG. 5, the module housing 90 includes an upper half housing part 91 and a lower half housing part 110 which are both formed of, for example, aluminum.

The upper half housing part 91 includes multiple heat releasing fins 92 at its upper surface. The heat releasing fins 92 are elongated in directions Y1-Y2 and are aligned in directions X1-X2. Numerals 93, 94 indicate connecting parts which are provided at the ends of the upper half housing part 91 in directions Y1 and Y2 for connecting the adjacently aligned heat releasing fins 92. The upper surface of the heat releasing fins 92 and the upper surfaces of the connecting parts 93, 94 are situated on the same plane. A base seat part 95 is provided to the inner side of the upper half housing part 91 for attachment to the printed board 60. In direction X2, the upper half housing part 91 has an upper half flange part 96 and an upper half cover part 97 provided thereto. The upper half cover part 97 includes a rib part 98 projecting inward along a tip rim part. The upper half cover part 97 also includes protruding parts 100, 101 provided at the inner surface thereof. The upper half cover part 97 also includes a step part 102 provided at the inner surface thereof toward direction X2. A shallow recess part 103 for a heat releasing sheet is formed in the back surface (lower plane) at the center of the upper half housing part 91 (i.e. at a portion of the back surface at which heat releasing fins 92 are formed). The recess part 103 has a ceiling (top plane) provided with multiple projecting parts 104. Furthermore, the upper half flange part 96 has a notch part 105 in which a rod part of the pull sleeve travels therethrough.

In direction X2, the lower half housing part 110 has a lower half flange part 111 and a lower half cover part 112 provided thereto. The lower half cover part 112 includes a rib part 113 projecting inward along a tip rim part. The lower half cover part 112 also includes protruding parts 114, 115 provided at the inner surface thereof. Furthermore, attachment parts (for attachment to the latch mechanism 150, described afterwards) 116, 117 are formed at the inner sides in directions Y2 on the side toward direction X2 of the lower half housing part 110. Furthermore, a guiding groove(s) 118 elongated in directions X1-X2 is provided in the outer plane at the side(s) of the lower half housing part 110.

As shown in FIG. 4, the data communication assembly 51 is housed in the module housing 90 comprising the upper half housing part 91 and the lower half housing part 110 in a manner where a part of the printed board 60 is fastened with a screw 120 to a back side of the upper half housing part 91 via the base seat part 95, and another part of the printed board 60 is fastened together with the upper half housing part 91 and the lower half housing part 110 by a screw provided between the upper half housing part 91 and the lower half housing part 110. Furthermore, the upper half cover part 97 and the lower half cover part 112 are combined to form a cover part 122, and the upper half flange part 96 and the lower half flange part 111 are combined to form a flange part 119.

The connector plug 80 is installed in the cover part 122. The plug part 83 protruding from the cover part 122 is exposed. The card edge contact part 61 is provided in a manner facing the X1 end of module housing 90. The heat releasing sheet 130 housed in the recess part 103 and is sandwiched between the upper plane of the LSI (semiconductor package) 70 and the lower plane of the upper half housing part 91. Instead of having an entire plane abut the heat releasing sheet 130, multiple projecting parts 104 abut the heat releasing sheet 130 so as to reduce the amount of force applied to the LSI (semiconductor package) 70 in the X2 direction via the heat releasing sheet 130. This prevents applying of excessive force or creation of cracks at the connection part between the LSI 70 and the printed board 60. Thereby, electric connection can be prevented from being damaged.

Next, the portion of the connector plug 80 is described with reference to FIGS. 6 and 7.

The connector plug 80 is sandwiched at two locations in directions Y1-Y2 by having a pair of protruding parts 100, 101 abut a pair of protruding parts 81b, 81c and having another pair of protruding parts 114, 115 abut another pair of protruding parts 81d, 81e. Since the protruding parts 100, 101, 114, 81b, 81c, 81d, and 81e are formed with precise measurements, the connector plug 80 can be precisely fixed to the module housing 90 in the Z1-Z2 direction.

With respect to the X1-X2 direction, the connector plug 80 is fixed by having the rib parts 98, 113 engaged with a portion of the connector plug 80 and having the step part 102 engaged with the overhang part 81f.

Accordingly, when the transceiver module 50 is mounted on the server apparatus 20 or when the cable connector 40 is connected to the server apparatus 20, the force applied to the connector plug 80 in the X1 direction is received by the module housing 90 by having the overhang part 81f abut the step part 102. Furthermore, when the transceiver module 50 is pulled out from the server apparatus 20 and when the cable connector 40 is pulled out from the server apparatus 20, the force applied to the connector plug 80 in the X2 direction is received by the module housing 90 by having the end parts (situated toward X2) of the connector plug 80 abut the rib parts 98, 113. Accordingly, no undesired force is applied to the portion where the terminal part(s) 86 is soldered to the printed board 60.

As shown in FIG. 7, a metal sponge-like gasket 140 is situated between the protruding part 81b and the protruding part 81c in the Y1-Y2 direction and between the shield member 84 and the upper half housing part 91 in the Z1-Z2 direction. Furthermore, a metal sponge-like gasket 141 is situated between the protruding part 81d and the protruding part 81e in the Y1-Y2 direction and between the shield member 84 and the lower half housing part 110 in the Z1-Z2 direction. This arrangement serves to prevent EMI (electro-magnetic interference).

Next, the portion of the heat releasing fins 92 provided on the upper plane of the transceiver module 50 is described. Supposing that the connection parts (connection areas) 93, 94 connecting the heat releasing fins 92 are not provided to the upper half housing part 91 in a manner surrounding the heat releasing fins 92 as shown in FIG. 5, the heat releasing fins 92 are caught at the insertion port 23 of the front panel 22 by abutting the rim part of the insertion port 23 in a case where the transceiver module 50 (at the side toward direction X2) is pulled in the direction X1 when the transceiver module 50 is inserted in the server apparatus 20, to thereby prevent the transceiver module 50 from inserted further into the server apparatus 20. In other words, conventionally, since the heat releasing fins are provided by forming grooves extending one end to the other end on the upper plane of the conventional housing in the width direction of the housing (Y1-Y2 direction), the heat releasing fins tend to be stuck (caught) at the insertion port of the front panel in a case where the transceiver module (at the side toward direction X2) is pulled in the direction X1 when the transceiver module is inserted in the server apparatus. This prevents the conventional transceiver module from being further inserted into the server apparatus. However, as shown in FIG. 5, the heat releasing fins 92 according to an embodiment of the present invention is provided by forming grooves at a center area of the upper plane of the housing 90 in a manner surrounded by connection parts 93, 94. Accordingly, in the embodiment of the present invention, even in a case where the transceiver module 50 (at the side toward direction X2) is pulled in the direction X1 when the transceiver module 50 is inserted in the server apparatus 20, the connection parts 93, 94 contact a rim part of the insertion port 23 of the front panel 22 (i.e. the heat releasing fins 92 do not contact the rim part of the insertion port 23), to thereby restrict the movement of the transceiver module 50 in the Z1 direction. Accordingly, the process of inserting the transceiver module 50 in the server apparatus 20 and the process of pulling out the transceiver module 50 from the server apparatus 20 become easier.

It is to be noted that the transceiver module 50 is inserted in the server apparatus 20 by having the guiding grooves 118 (provided on its sides) guided by the guide rails 21b of the mounting base part 21.

Configuration and Operation of Latch Mechanism of Transceiver Module

Figure 8:
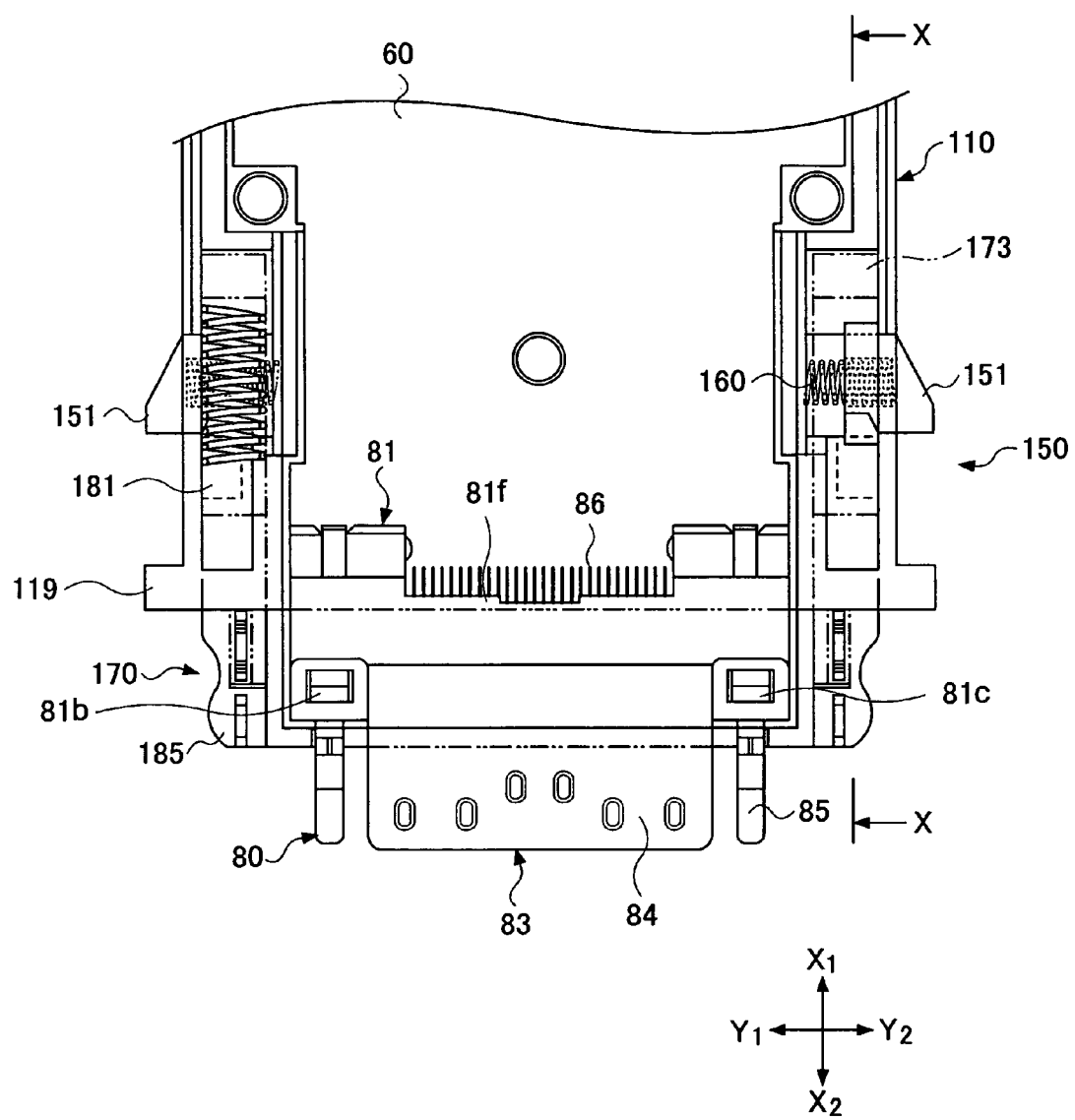
FIG. 8 is an enlarged plane view of a latch mechanism shown in FIG. 3.
Figure 9:
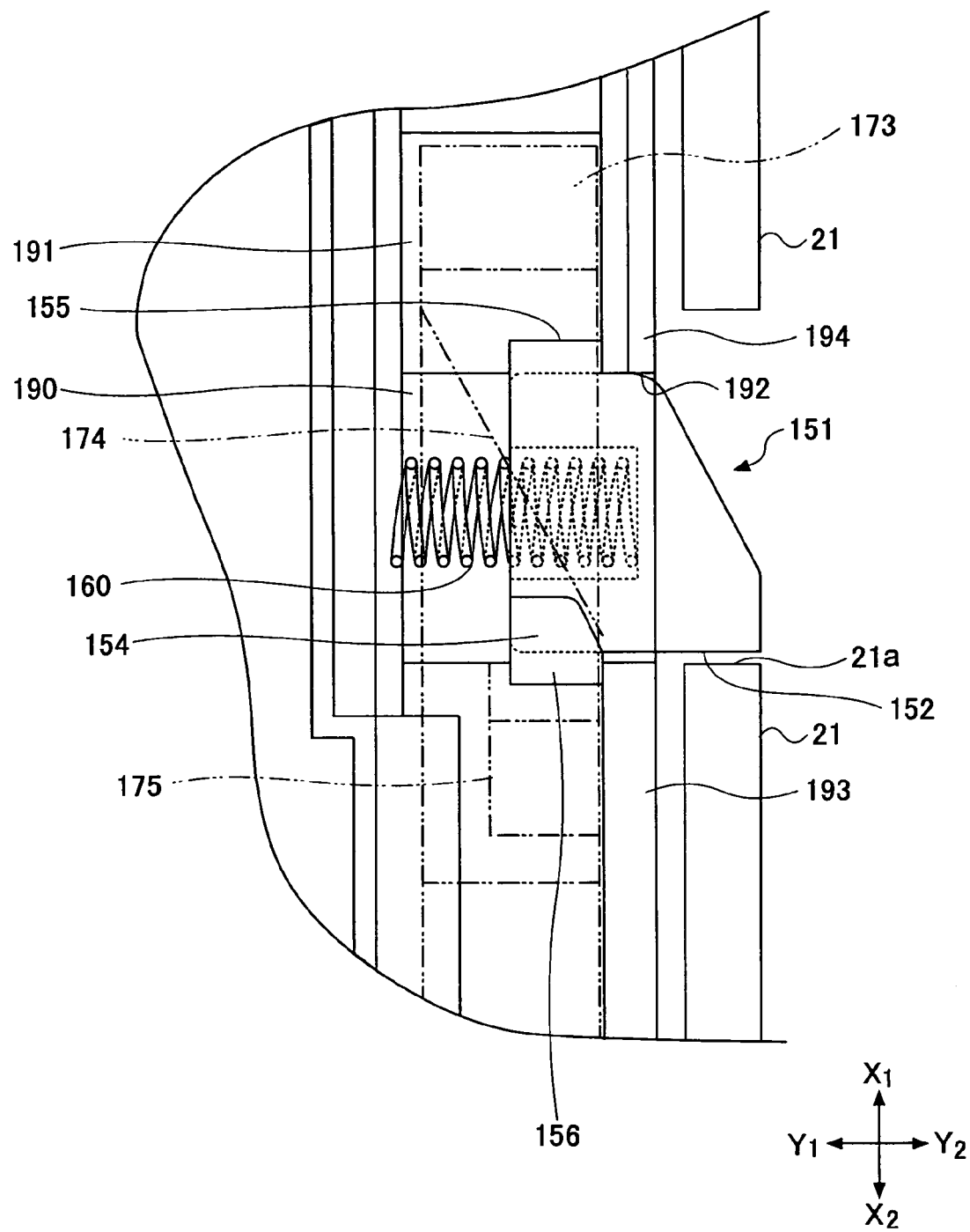
FIG. 9 is an enlarged plane view of a latch pawl part and related parts shown in FIG. 8 according to an embodiment of the present invention.
Figure 10:
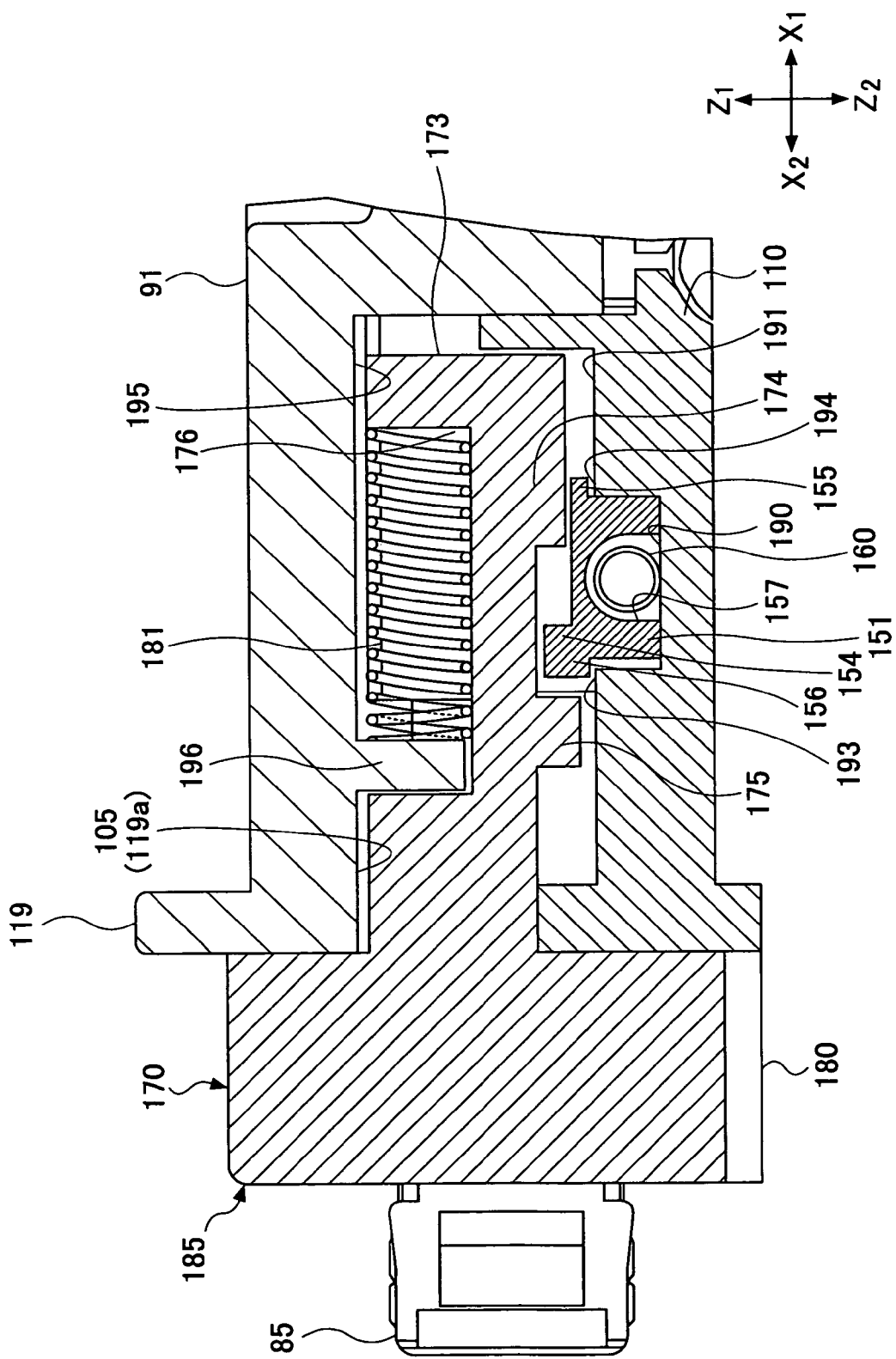
FIG. 10 is a cross-sectional view of the latch mechanism taken along line X-X of FIG. 8 according to an embodiment of the present invention.
Figure 11:
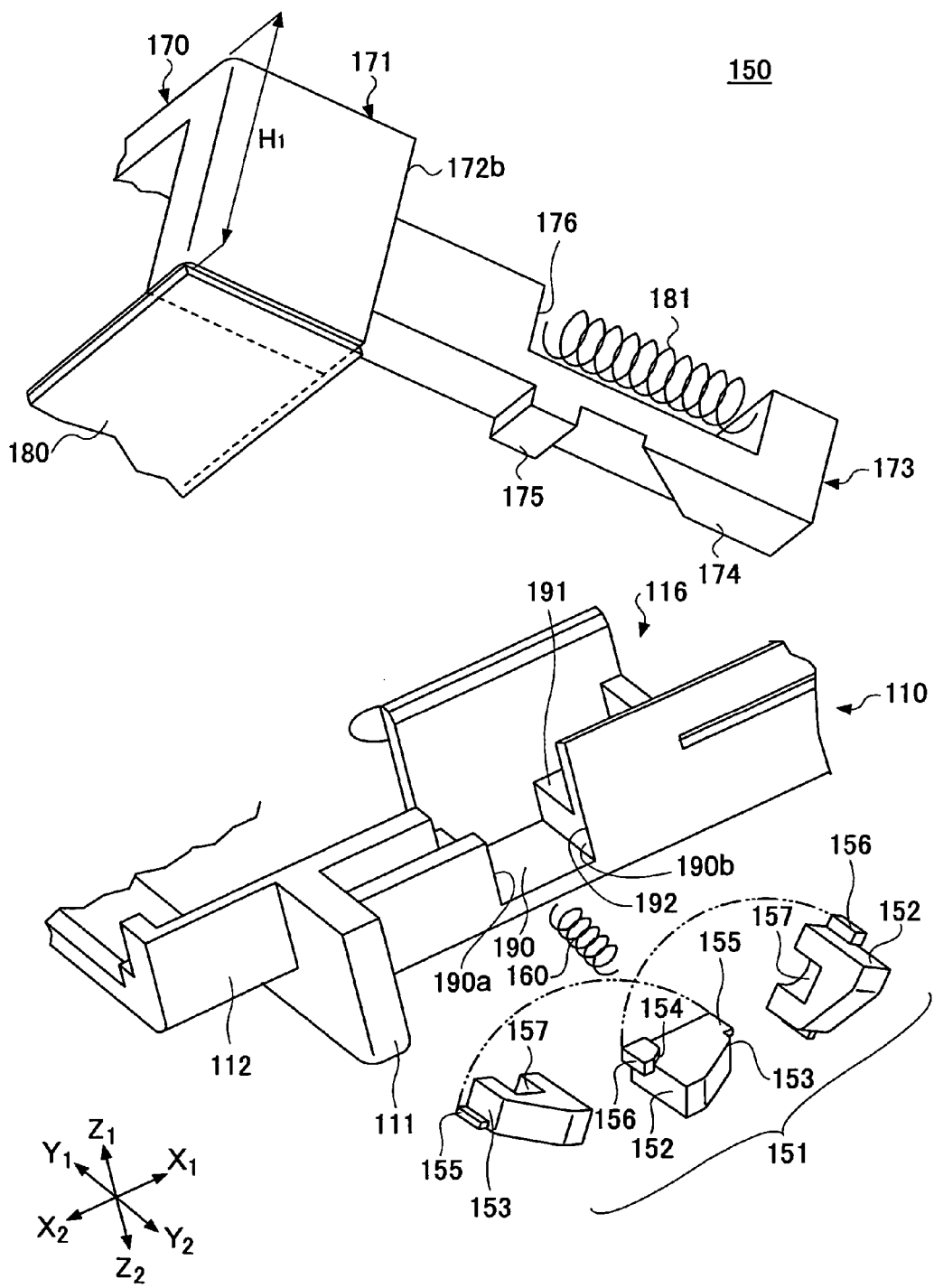
FIG. 11 is a partial exploded view of a latch mechanism shown in FIG. 8 according to an embodiment of the present invention.

FIG. 8 shows a latch mechanism 150 for obtaining a latched state between the transceiver module 50 and the server apparatus 20. FIG. 9 is an enlarged view of a portion of a latch pawl part 151. FIG. 10 is a cross-sectional view taken along line X-X of FIG. 8. FIG. 11 is an exploded view of the latch mechanism 150.

The latch mechanism 150 includes latch pawl parts 151 provided on the Y2 side of the transceiver module 50 and the Y1 side of the transceiver module 50. Here, for the sake of convenience, description of the latch mechanism 150 with respect to the Y1 side is omitted since the configuration of the latch mechanism 150 with respect to the Y1 side is the same as that of the Y2 side.

As shown in FIG. 11, the latch mechanism 150 is provided with the latch pawl part 151 and a coil spring 160. The latch pawl part 151 and the coil spring 160 are separate components.

The latch pawl part 151 is an independent component. The latch pawl part 151 is configured having a pawl-like shape and a sufficient strength. The latch pawl part 151 has an engagement plane 152 toward the X2 direction and another plane 153 toward the X1 direction that is situated parallel to the engagement plane 152. Furthermore, as shown in FIG. 10, a first cam part 154 is provided at a part toward the X2 direction on the X1 plane of the latch pawl part 151. The first cam part 154 is provided in a manner protruding in the Z1 direction. The latch pawl part 151 also includes an overhang part 155 provided on the X1 plane thereof. The overhang part 155 is provided in a manner overhanging in the X1 direction. The latch pawl part 151 also includes another overhang part 156 provided on the X1 plane thereof. The overhang part 156 is provided in a manner overhanging in the X2 direction. The overhang part 156 is a part of the first cam part 154. The latch pawl part 151 also includes a groove part (groove part for installing coil spring) provided on the Z2 plane thereof. The groove part 157 is formed in a manner penetrating the latch pawl part 151 in the Y1 direction.

As shown in FIG. 5, the pull sleeve 170 includes a pull sleeve main body 171 and a lower metal plate member 180, and a coil spring 181. The pull sleeve main body 171 includes an inverted U-shaped pull sleeve part 172 and a pair of rod parts 173. The pull sleeve part 172 includes a horizontal plate part 172a and vertical plate parts 172b, 172c provided on the sides of the horizontal plate part 172a. The pair of rod parts 173 is provided extending from the vertical plate parts 172b, 172c in the X1 direction. The outer periphery of the pull sleeve part 172 is formed in a recessed manner for allowing it to be easily pulled by the finger tips. The rod part 173 has a rectangular shaped cross-section. The rod part 173 includes a wedge-shaped second cam part 174 and a protruding part 175 projecting in the X2 direction. Furthermore, the rode part 173 includes a recess part 176 provided in the Z1 direction.

The pull sleeve main body 171 covers the top and sides of the cover part 122. The lower metal plate member 180 is placed across between the vertical plate part 172b and the vertical plate part 172c. Thereby, the pull sleeve main body 171 and the lower metal plate member 180 are form a square frame part 185 and surround the cover part 122. The pull sleeve main body 171 and the lower metal plate member 180 are engaged in a manner slidable in the X2 direction. Since the lower metal plate part 180 is provided at the lower part of the square frame part 185, the length H1 of the square frame part 185 with respect to the Z1-Z2 direction becomes shorter, and the height H2 of the flange part 119 of the transceiver module 50 becomes shorter.

The rod parts 173 are inserted in the module housing 90 through the notch part 105 of the upper half flange part 96 (i.e. opening 119a of the flange part 119).

As shown in FIG. 11, the attachment part 116 of the lower half housing part 110 includes a groove part 190 extending in directions Y1-Y2 and another groove part 191 extending directions X1-X2. The groove part 190 is provided for housing the latch pawl part 151 and the coil spring 160. The groove part 191 is provided for housing the rod parts 173 of the pull sleeve main body 171. The groove part 191 includes an opening 192 provided at its edge part toward direction Y2. The side wall of the lower half housing part 110 includes stopper areas (stopper portions) 193, 194 having the opening 192 situated therebetween. The upper half housing part 91 includes a groove part 195 facing the groove part 191 and a rib part 196. The groove part 195 is provided for housing the rod part 173 (the rod part 173 that is situated toward the Z1 direction) and the coil spring 181. The rib part 196 abuts a part of the recess part 176 toward the X2 direction. The coil spring 181 is provided between the rib part 196 and a wall of the recess part 176 toward the X1 direction.

The latch pawl part 151 is engaged with the coil spring 160 in the groove part 190 in a slidable manner in the Y1-Y2 direction. The overhang parts 155, 156 are situated at the bottom plane of the groove part 191. The rod part 173 is housed in the groove part 191 in a manner covering the latch pawl part 151. A portion of the rod part facing the Z1 direction is engaged with coil spring 181 in the groove part 195. The rod part 173 is slidable in the X1-X2 directions. The coil spring 181 is situated between end of the recess part 176 toward the X1 direction and the end of the groove part 195 toward the X2 direction.

FIGS. 8, 9, and 10 show the latch mechanism 150 and its parts being in a normal state. The pull sleeve 170 is provided in a state being urged in the X1 direction by the spring force of the coil spring 181. The square frame part 185 is provided in a manner surrounding the cover part 122. The second cam part 174 is provided more toward the X1 direction than the first cam part 154 of the latch pawl part 151. The latch pawl part 151 is moved in the Y2 direction (outward direction of the module housing 90) by the urging spring force of the coil spring 160 until reaching a state where the overhang parts 155, 156 abut the stopper portions 193, 194. In this state, the latch pawl parts 151 has a portion thereof projecting from the opening 192 of the groove part 191.

In inserting the transceiver module 50 in the server apparatus 20 (as shown in FIG. 4), the latch pawl part 151 is, first, thrust into the module housing 90 and then projects into the engagement opening 21a of the transceiver module base part 21, to thereby latch the transceiver module 50 to the server apparatus 20.

Figure 12:
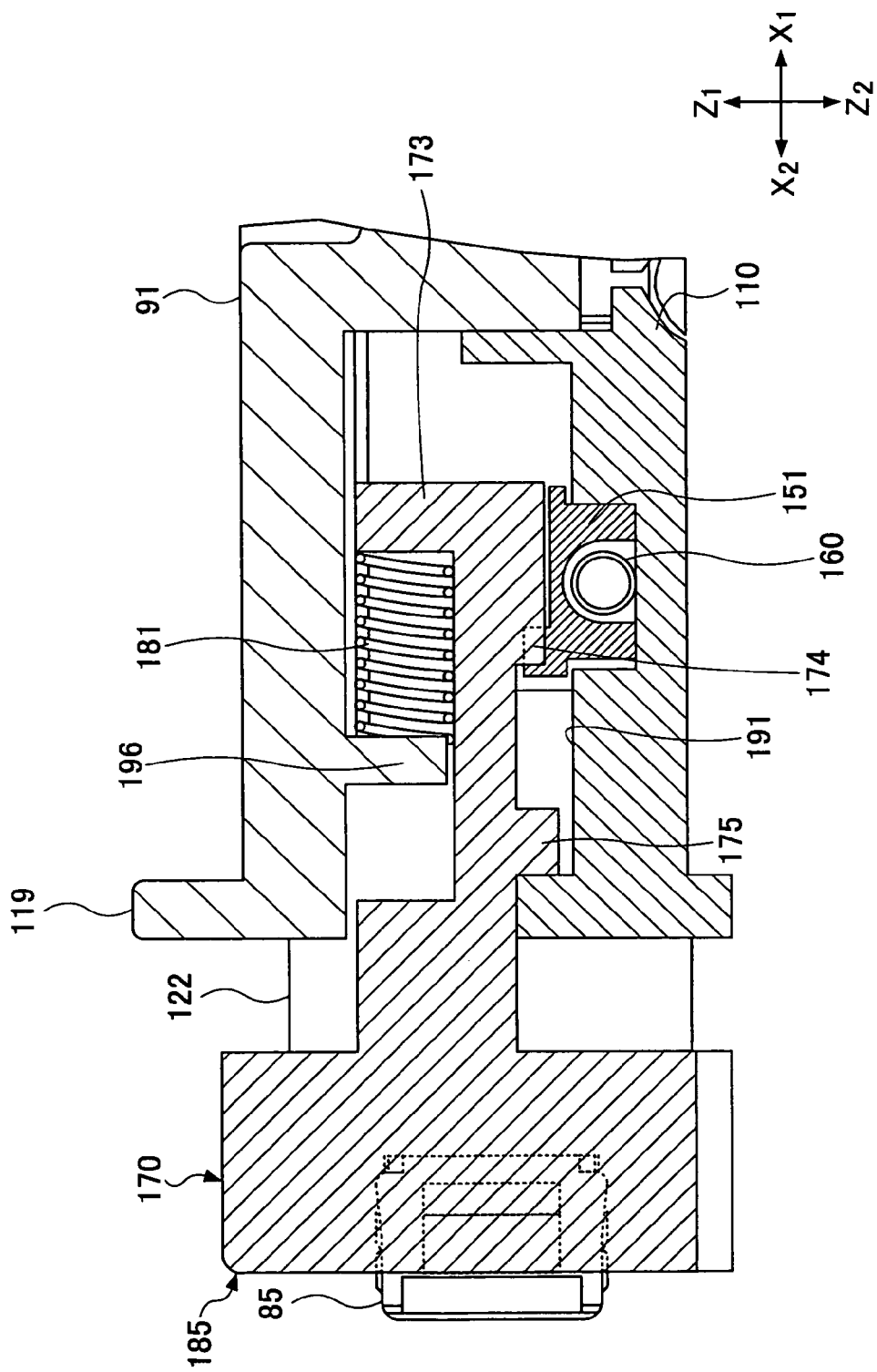
FIG. 12 is a cross-sectional view of a latch mechanism in a state where a pull sleeve is pulled according to an embodiment of the present invention.
Figure 13:
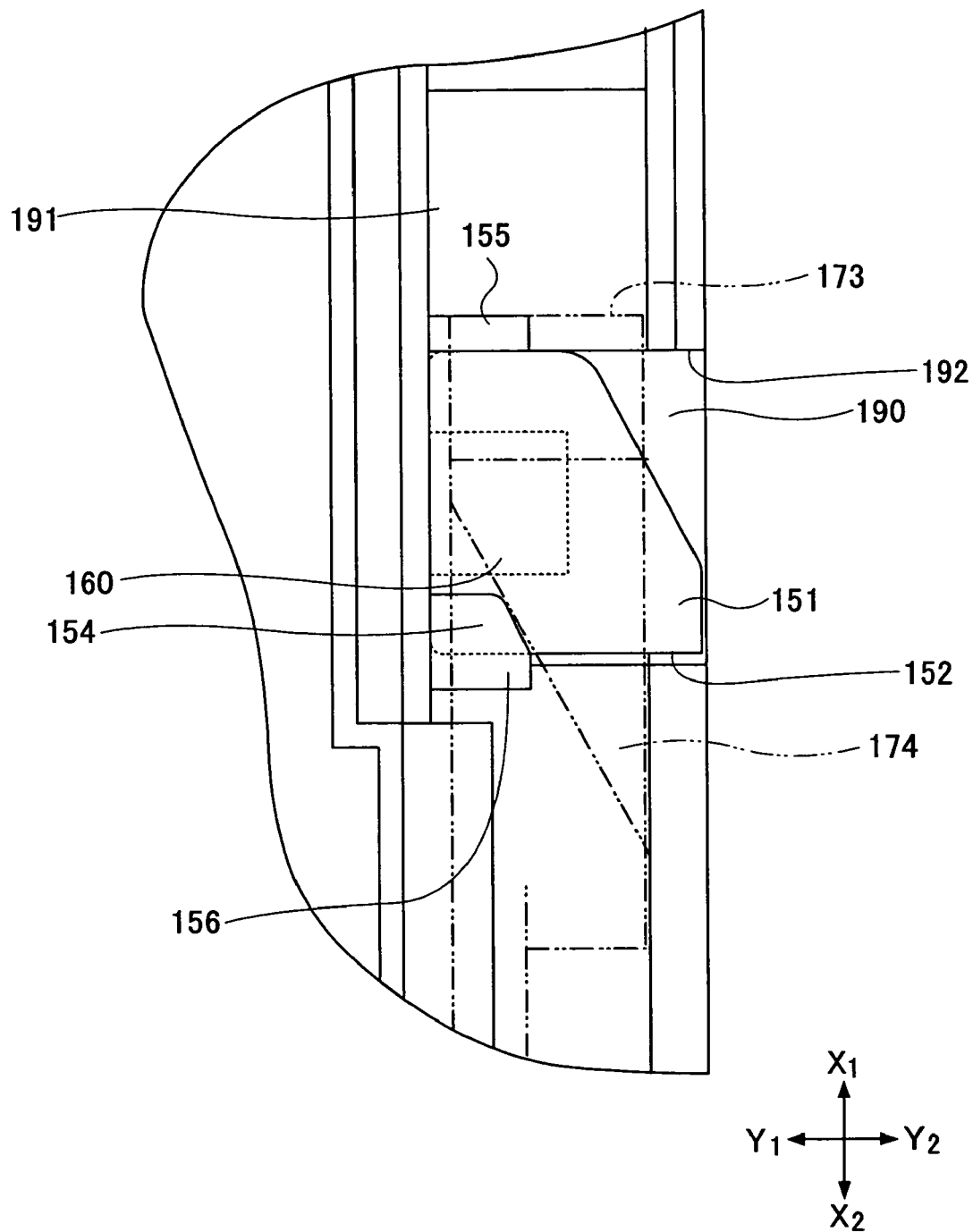
FIG. 13 is an enlarged plane view of a latch pawl part and related parts in state where a pull sleeve is pulled according to an embodiment of the present invention.

In pulling out the transceiver module 50 from the server apparatus 20, the user holds the square frame part 185 of the pull sleeve 170 and forcefully pulls the pull sleeve in the X2 direction. This maneuver by the user causes the coil spring 181 to bend and move the square frame part 185 in the X2 direction. With reference to FIG. 13, the second cam part 174 pushes the first cam part 154 of the latch pawl part 151, so that the latch pawl part 151 retreats into the module housing 90 by moving in the Y1 direction (inward direction of the module housing 90) against the urging force of the coil spring 160. Thereby, the latched state is released. Furthermore, with reference to FIG. 12, the protruding part 175 abuts the end part of the groove part 191 in the direction X2. The pulling force, which is generated by the user pulling the pull sleeve 170 in the X2 direction, is transmitted to the module housing 90 via the rod part 175. Then, the transceiver module 50 is moved in the X2 direction. Then, the card edge contact part 61 is pulled out from the connector 25. Then, the transceiver module 50 is pulled out from the server apparatus 20.

When the user releases his/her hand from the square frame part 185 of the pull sleeve 170, the pull sleeve 170 is moved in the X1 direction X1 to its original position via the coil spring 181.

Figure 14:
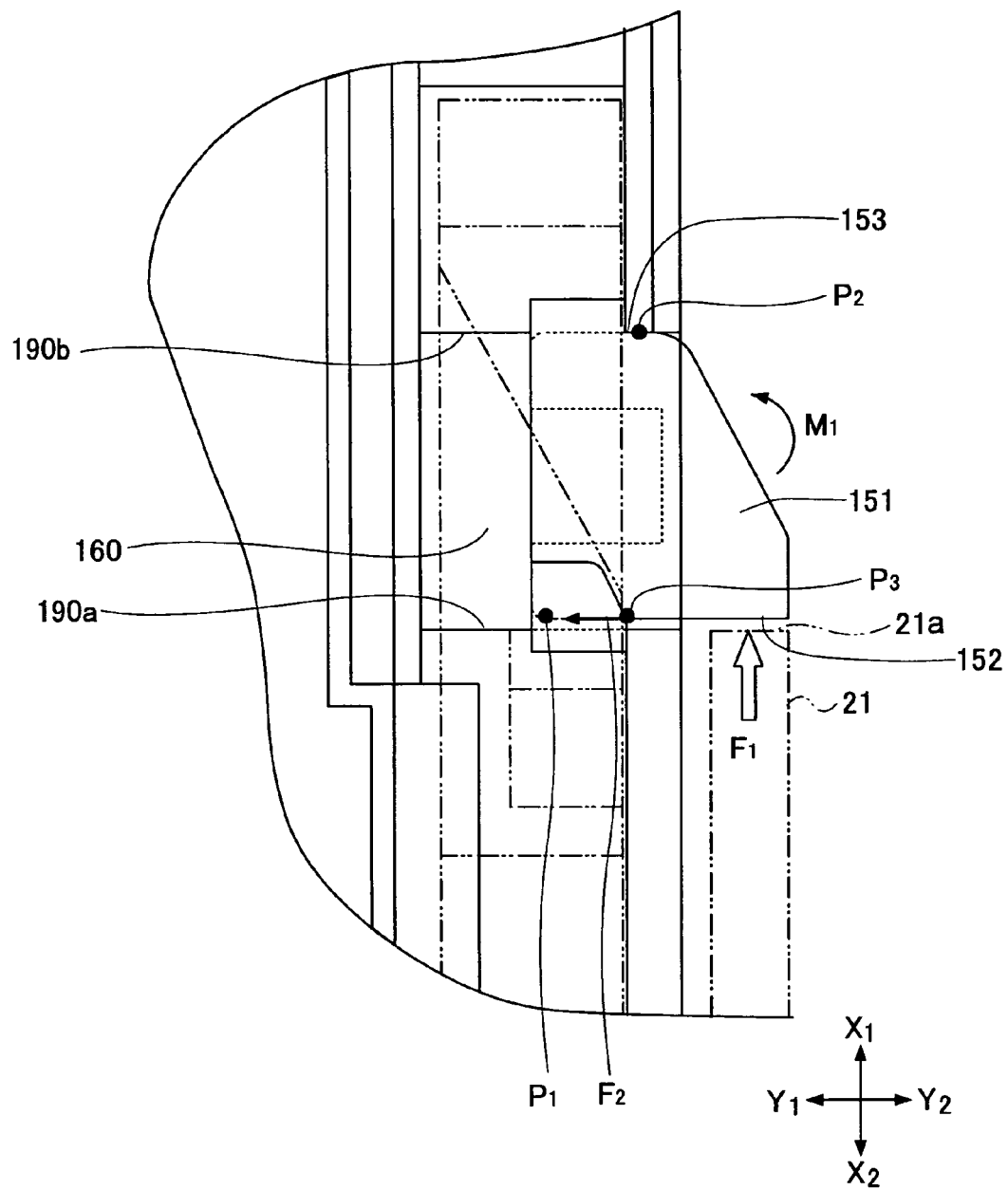
FIG. 14 is an enlarged plane view of a latch pawl part in a case where a pulling force is applied to a transceiver module according to an embodiment of the present invention.

Next, with reference to FIG. 14, the state of the latch mechanism 150 is described in a case where a pulling force works on the transceiver module 50 (e.g. when the cable connector 40 is accidentally pulled).

As described above, the latch pawl part 151 has a sufficient strength and is in an engaged state inside the groove part 190. The latch pawl part 151 has planes 152 and 153 which are disposed in a manner facing the side planes 190a, 190b of the groove part 190.

When a pulling force works on the transceiver module 50, a force F1 directed in the X1 direction is applied to a part of the latch pawl part 151 in the Y2 direction from an edge of the engagement opening 21a of the mounting base part 21. As a result, a moment M1 in a clockwise direction (having point P2 on the plane 153 as a center) is generated at the latch pawl part 151.

Accordingly, the latch pawl part 151 is firmly supported at the two points P1 and P2 by having the plane 152 abut the side plane 190a and the plane 153 abut the side plane 190b owing that a) the latch pawl part 151 has a sufficient strength, b) the latch pawl part 151 is in an engaged state in the groove part 190, c) the planes 152, 153 are disposed in a manner facing the corresponding side planes 190a, 190b. Accordingly, the latch pawl part 151 can be prevented from deforming and from being positioned in a slanted manner.

It is to be noted that the moment M1 is also generated in a case where the user pulls the pull sleeve 170 in the X2 direction for pulling out the transceiver module 50 from the server apparatus 20.

In this example, the first cam part 154 of the latch pawl part 151 is disposed at a portion of the latch pawl part 151 toward the X2 direction. Therefore, in a case where the user pulls the pull sleeve 170 in the X2 direction, the point P3, at which a pressing force F2 is applied in the Y1 direction, becomes situated on the same position as the engagement plane 152 with respect to the X1-X2 direction. Accordingly, the force F2 moves in a direction that offsets the moment M1. This allows the latch pawl part 151 to smoothly move in the Y1 direction inside the groove part 190.

It is to be noted that a same latch mechanism is provided on the side of the Y1 direction. Accordingly, the latch pawl part 151 provided on the side of the Y2 direction and the latch pawl part 151 provided on the side of the Y1 direction are simultaneously drawn into the module housing 90 when the pull sleeve 170 is pulled.

Furthermore, as an alternative of the connector plug 80, the latch mechanism 150 may be provided with an optical connector at the front side for a transceiver module having an opto-electric conversion part.

Second Embodiment

Figure 16:
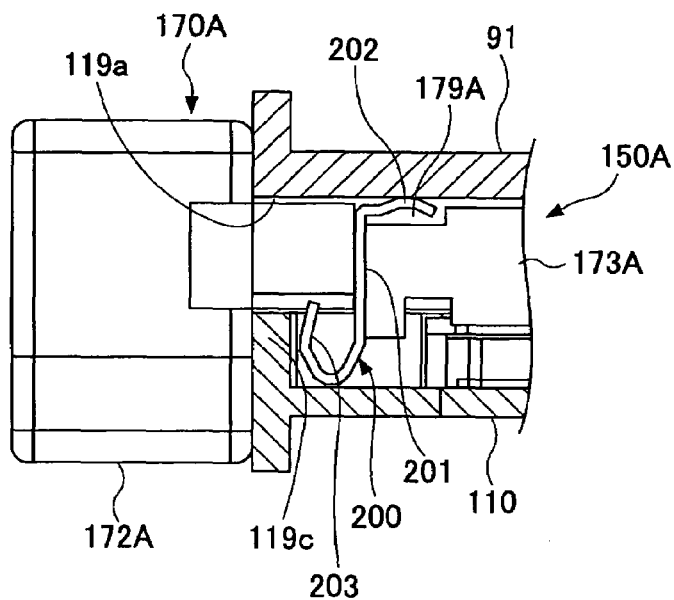
FIG. 16 is a cross-sectional view of a pull sleeve part of a latch mechanism in the transceiver module shown in FIG. 15.

A transceiver module 50A according to a second embodiment of the present invention is described with reference to FIGS. 15 and 16. FIG. 15 is an exploded view of the transceiver module 50A. Compared to the transceiver module 50 shown in FIGS. 3 and 4, a portion of the latch mechanism 150A of the transceiver module 50A is different from that of the latch mechanism 150 of the transceiver module 50. Other than the difference of the latch mechanisms 150, 150A, the transceiver module 50A has a same configuration as that of the transceiver module 50. Therefore, further description of other portions is omitted.

Figure 17:
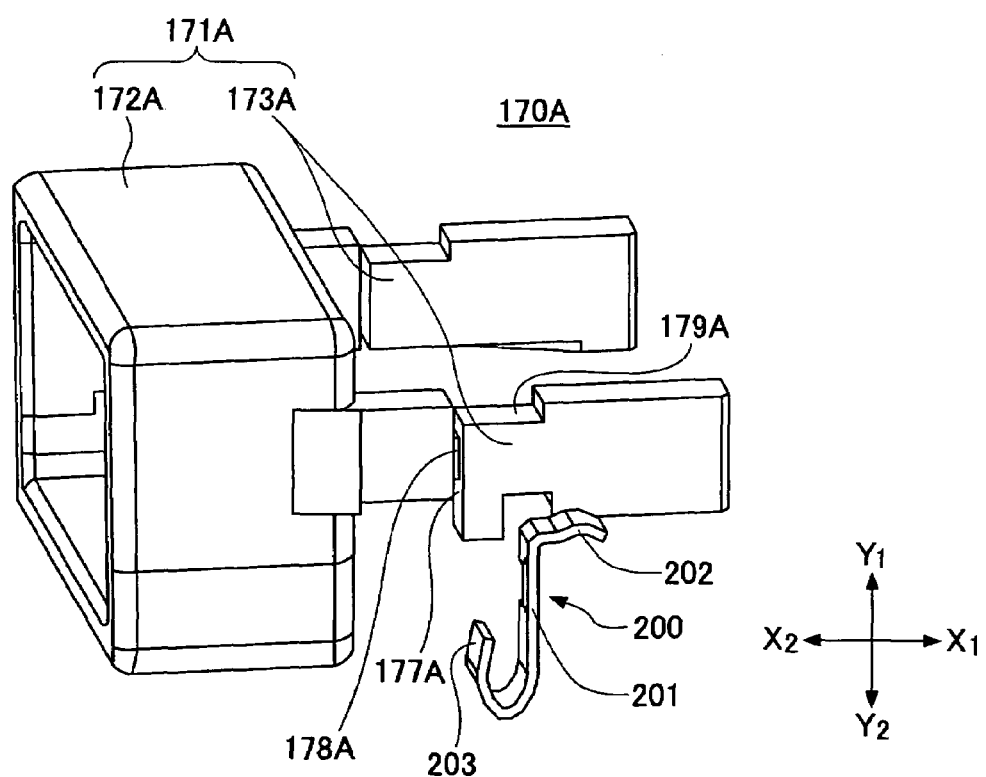
FIG. 17 is an enlarged perspective view of a pull sleeve according to an embodiment of the present invention.

The latch mechanism 150A includes a pull sleeve 170A shown in FIG. 17. The pull sleeve 170A does not include a coil spring 181, but is provided with a pull sleeve main body 171A and a planar shield member 200 as shown in FIGS. 16 and 17.

For the purpose of, for example, cost reduction and weight reduction, the pull sleeve main body 171A is fabricated as a mold component formed with synthetic resin. The pull sleeve main body 171A includes a pull sleeve part 172A shaped as a square frame, and two rod parts 173A projecting in the X1 direction from both sides of the pull sleeve part 172A. Each rod part 173A is formed with a square column-like shape and is provided with a slit 177A and a recess part 179A. The slit 177A is cut into a U-shape from the outer side of the pull sleeve main body 171A. A square-shaped core part 178A is provided at the far end of the slit 177A (see FIG. 18). The recess part 179A is formed on the Z1 plane of the rod part 173A from the position of the slit 177A in the direction toward X1.

Figure 18:
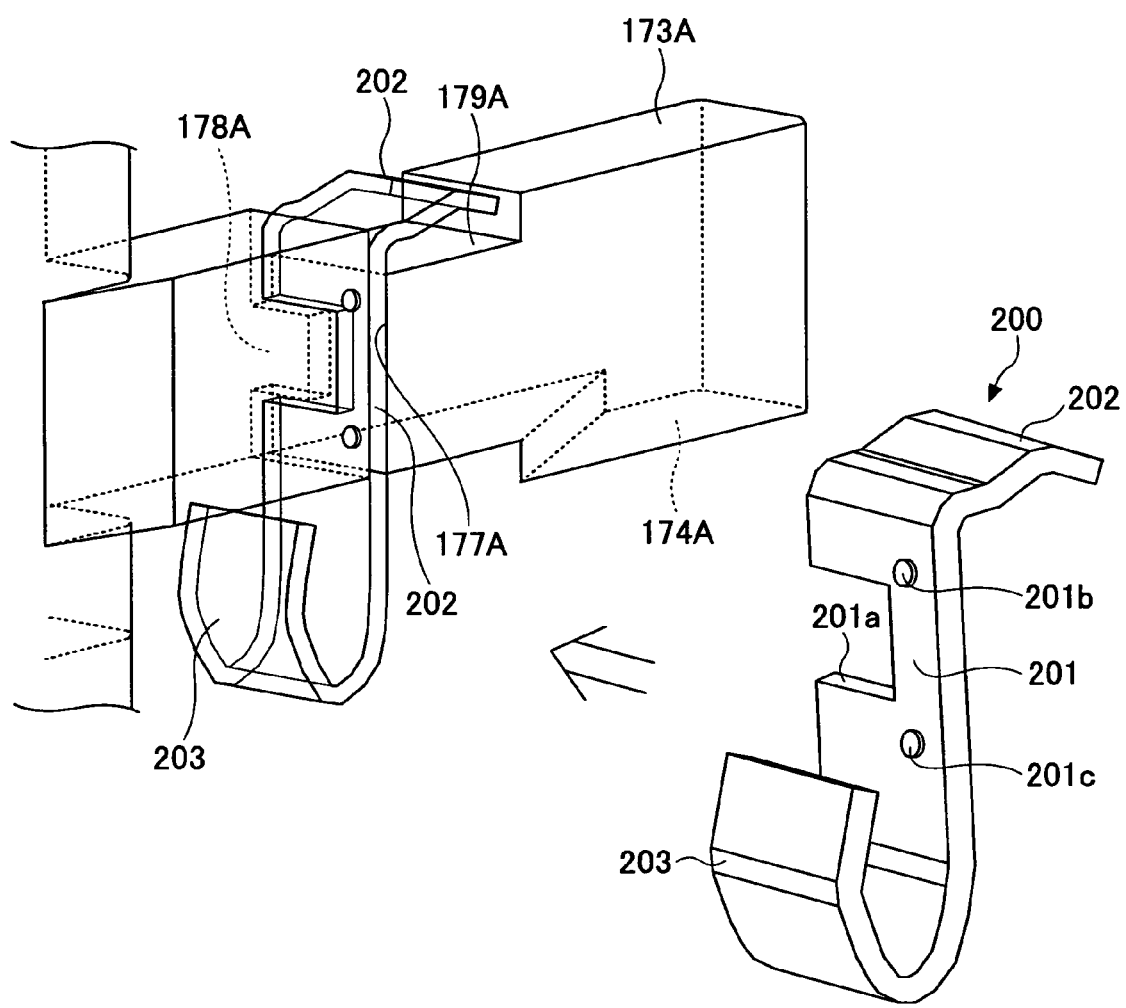
FIG. 18 is a schematic view for describing attachment of a planar shield member to a rod part according to an embodiment of the present invention.

As shown in FIG. 18, the planar shield member 200 is a metal planar member. The planar shield member 200 includes a main body part 201, a convexo planar spring part 202 situated above the main body part 201, and a U-shaped planar spring part situated below the main body part 201. The main body part 201 is formed as a plane. The main body part 201 has a size corresponding to that of the notch part 105 of the upper half flange part 96 (opening 119a of the flange part 119). A square-shaped notch 201a corresponding to the core part 178A is provided on one side of the main body part 201. The main body part 201 also has projecting parts 201b, 201c provided in the vicinity of the corner of the notch 201a and more toward the Y2 direction with respect to the notch 201a. The planar spring part 202 is formed by being bent from the upper end of the main body part 201 in the X1 direction, to thereby form a convexo shape projecting in the Z1 direction. The U-shaped planar spring part 203 is formed by being bent from the lower part of the main body part 201 in the X2 direction, to thereby form a U-shape.

In fixing the planar shield member 200 to the rod part 173A in a perpendicular manner with respect to the axial line of the rod part 173A, the main body part 201 is mounted in the slit 177A of the rod part 173A of the pull sleeve main body 171A, the notch 201a is mounted to the core part 178A, and the projecting parts 201b, 201c are pressed into the slits 177A. The planar spring part 202 is housed in the recess part 179A.

The U-shaped planar spring part 203 is disposed in a state projecting from the rod part 173A in the Z2 direction.

Figure 19:
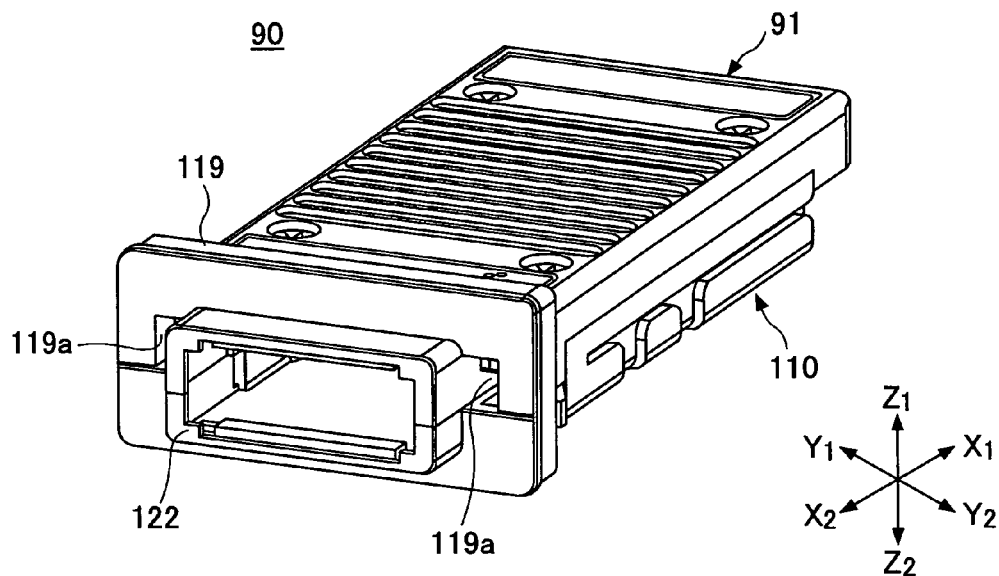
FIG. 19 is a perspective view of a module housing according to an embodiment of the present invention.

FIG. 19 shows a module housing 90 having an upper half housing part 91 combined to a lower half housing part 110. A flange part 119 has square-shaped openings 119a provided in the Y1 and Y2 directions thereof. The openings 119a are openings for allowing a base part of the rod part 173A to be inserted therethrough. The openings 119a are, therefore, formed in a shape corresponding to the cross-section of the base part of the rod part 173A.

In assembling the pull sleeve 170A, the upper half housing part 91 and the lower half housing part 110 are combined such that the upper half cover part 97 and the lower half cover part 112 are engaged in the inner side of the pull sleeve part 172A and that the notch part 105 of the upper half flange part 96 is engaged with the base part of the rod part 173A. As shown in FIG. 16, the rod part 173A is housed in the module housing 90. In the housed state, the planar spring part 202 abuts an upper plane of the upper half housing part 91, the U-shaped planar spring part 203 has a Z2 direction part abutting a bottom plane of the lower half housing part 110, the U-shaped planar spring part 203 also has a tip part abutting a vertical rib 119c at the inner part of the lower half housing part 110.

Next, the function and effect of the planar shield member 200 of the latch mechanism 150A.

First, the planar shield member 200 has a shielding function. That is, in a case where the transceiver module 50A is mounted to the transceiver module mounting base part 21 of the server apparatus 20, the module housing 90 is in a state of frame ground potential. Furthermore, as shown in FIG. 15, the main body part 201 and the U-shaped planar spring part 203 is situated immediately behind the opening 119a. Therefore, the planar shield member 200 provides an effect of preventing the electromagnetic waves generated inside the transceiver module 50A from leaking outside through the opening 119a. Accordingly, the planar shield member 200 has a function of preventing EMI at the portion of the opening 119a.

Secondly, the planar shield member 200 functions as a spring for returning the pulled pull sleeve 170A back into its original position. When the user holds the pull sleeve main body 171A and forcefully pulls the pull sleeve main body 171A in the X2 direction, the U-shaped planar spring part 203 bends to release the locked state. Thereby, the transceiver module 50A is pulled out from the server apparatus 20. When the user releases the pull sleeve main body 171A, the U-shaped planar spring part 203 bends back to allow the pull sleeve 170A to return (in the X1 direction) to its original position.

It is to be noted the pull sleeve 170A is fabricated by having the planar shield member 200 formed by insert molding.

Third Embodiment

Figure 20:
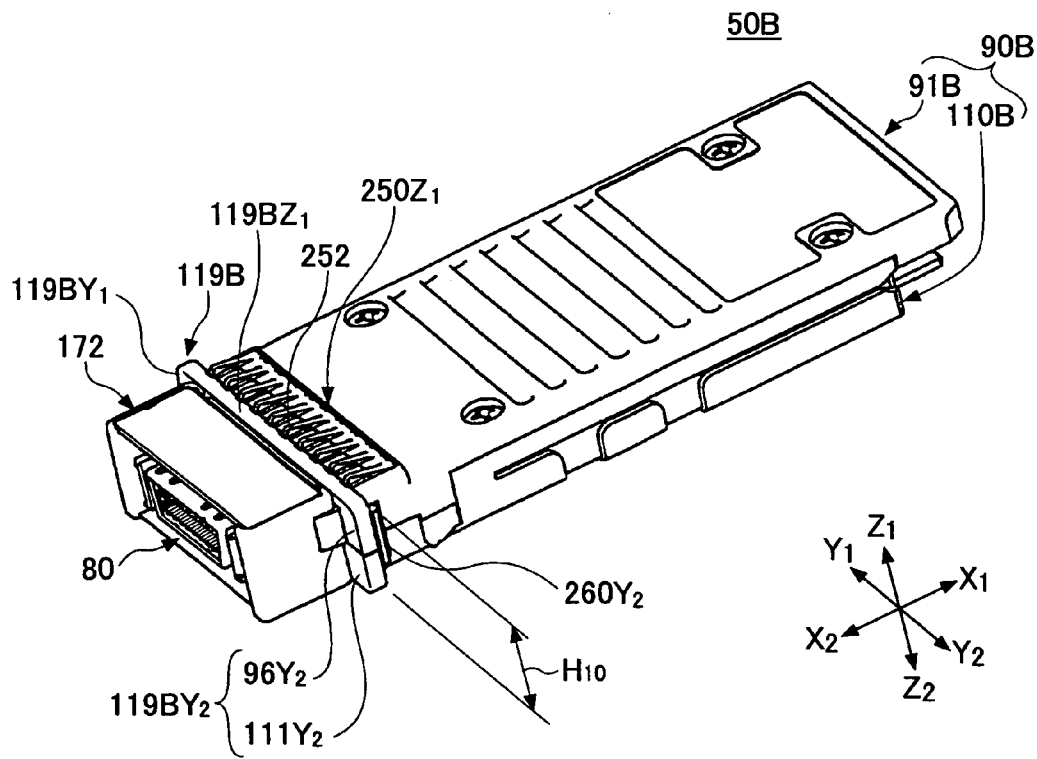
FIG. 20 is a perspective view of a transceiver module according to a third embodiment of the present invention.

FIG. 20 shows a transceiver module 50B according to a third embodiment of the present invention. Compared to the transceiver module 50 shown in FIGS. 3 and 4, the transceiver module 50B has a height H10 which is less than the height H2 of the transceiver module 50. The transceiver module 50B is a low-type transceiver module. A gasket 250 (250Z1, 250Z2) is provided to an upper plane and a lower plane of a portion behind a flange part 119B. The gasket 250 is a spring type gasket made of a metal material. Another gasket 260 (260Y1, 260Y2) is provided to a left plane and a right plane of the portion behind the flange part 119B. The gasket 260 is shaped as a cylinder. Components of the transceiver module 50B besides the aforementioned parts of the transceiver module 50B are the same as those of the transceiver module 50 and further description thereof is omitted.

Figure 23:
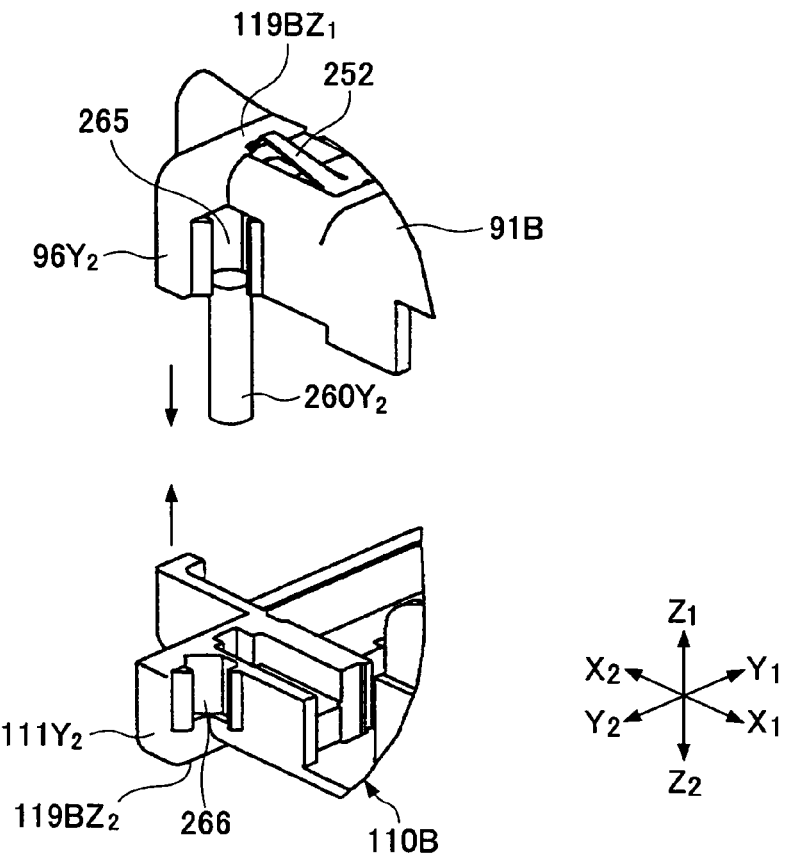
FIG. 23 is a schematic view for describing attachment of a cylindrical gasket according to an embodiment of the present invention.

As shown in FIGS. 20 and 23, the flange part 119B of a module housing 90B of the transceiver module 50B includes a Z1 flange part 119BZ1 (part of the flange part 119B situated toward the Z1 direction), a Z2 flange part 119BZ2 (part of the flange part 119B situated toward the Z2 direction), a Y1 flange part 119BY1 (part of the flange part 119B situated toward the Y1 direction), and a Y2 flange part 119BY2 (part of the flange part 119B situated toward the Y2 direction). The Y2 flange part 119BY2 has a Y2 upper half flange part 96Y2 and a Y2 lower half flange part 111Y2, in which the Y2 upper half flange part 96Y2 and the Y2 lower half flange part 111Y2 are disposed adjacent to each other. The configuration of the Y1 flange part 119BY1 is the same as that of the Y2 flange part BY2.

Since a low type transceiver module is formed in a thin body, the Z1 flange part 119BZ1 has a low height h. Accordingly, a conventional square-frame sponge gasket cannot be used since the portion for engaging to the gasket is short. Therefore, the present invention employs the metal spring-type gasket 250 shown in FIG. 22.

Figure 22:
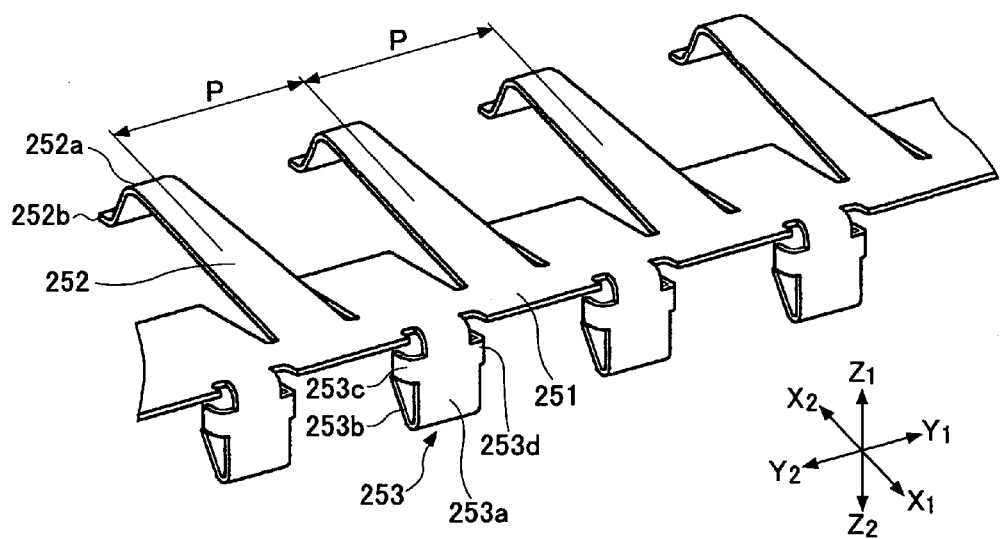
FIG. 22 is a perspective view of a metal spring-type gasket according to an embodiment of the present invention.

With reference to FIG. 22, the gasket 250 includes a belt part 251 extending in the Y1-Y2 directions, multiple planar spring parts 252 aligned with a predetermined pitch p, and multiple latch parts 253 provided at an edge part (toward direction X1) of the belt part 251. The planar spring parts 252 formed in a manner extending in the X2 direction and inclining in the Z1 direction. The pitch p is of a length that does not allow electromagnetic waves to pass therethrough. The planar spring parts 252 has its distal end formed with an S-shaped part 252a and a tip part 252b. The latch parts 253 are arranged between planar spring parts 252. The latch part 253 includes a main body part 253a which is bent in the Z2 direction, a planar spring part 253b that is bent back in the Z1 direction from a bottom end of the main body part 253a, and a pair of lug parts 253c, 253d that are bent in the X2 direction from both sides of the main body part 253a.

The gasket 250 is attached to an upper half housing part 91B and a lower half housing part 111B. Reference numeral 250Z1 indicates a gasket attached to the upper half housing part 91B and reference numeral 250Z2 indicates a gasket attached to the lower half housing part 111B.

Figure 21A:
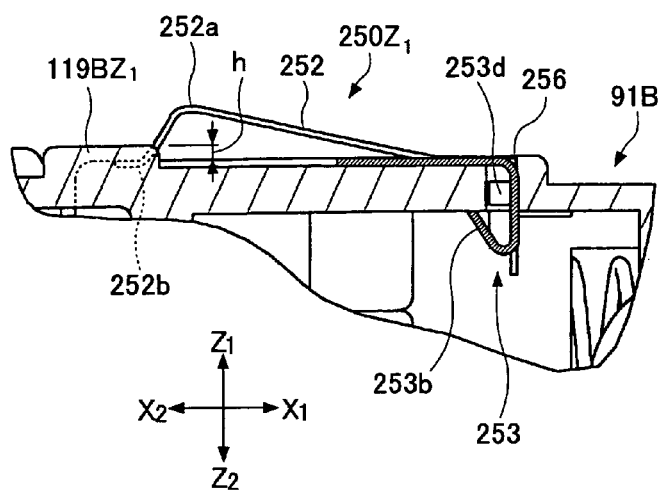
FIGS. 21A and 21B are cross-sectional views showing a portion to which a metal spring-type gasket of FIG. 20 is attached according to an embodiment of the present invention.
Figure 21B:
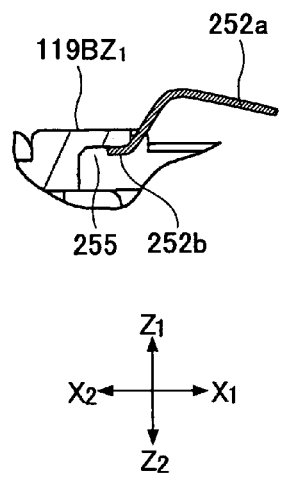

In the gasket 250Z1, the tip part 252b of the planar spring part 252 is engaged with a slit 255 formed in the Z1 flange part 119BZ1, as shown in FIG. 21B. Furthermore, the latch part 253 is inserted into a slit 256 of the upper half housing part 91B, as shown in FIG. 21A. Thereby, the planar spring part 253b engages with a back side of the upper half housing part 91B, and the lug parts 253c, 253d are engaged with the slit 256. That is, multiple planar spring parts 252 are attached to the Z1 flange part 119BZ1 (at a portion toward the X1 direction) in an aligned manner along the Z1 flange part 119BZ1 in the Y1-Y2 directions the gasket 250Z1. The planar spring parts 252 are attached to the Z1 flange part 119BZ1 such that its tip parts can flexibly bend in the Z2 direction.

Figure 25:
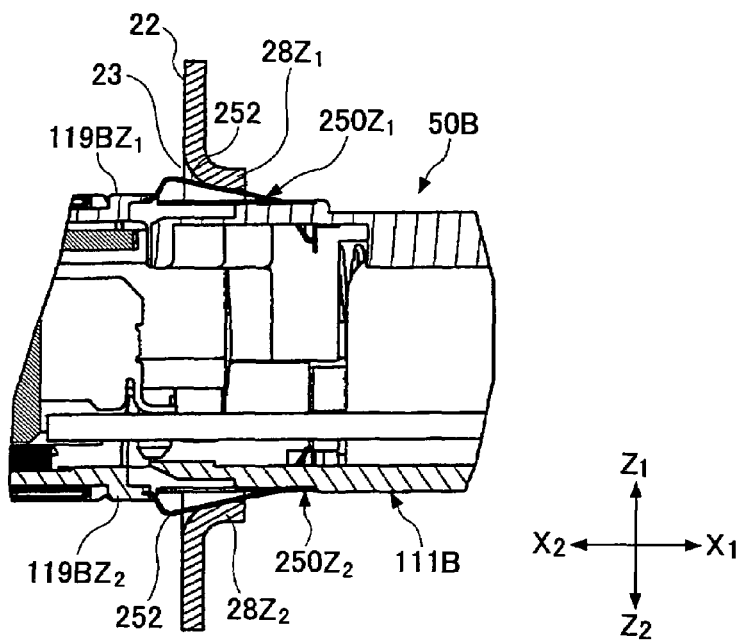
FIG. 25 is a vertical cross-sectional view showing an area of an insertion port of server apparatus having a transceiver module inserted therethrough according to an embodiment of the present invention.

As shown in FIG. 25, the gasket 250Z2 is attached to the lower half housing part 111B.

The cylindrical gasket 260Y2 shown in FIG. 23 has its upper half engaged with a recess part 265 provided to a rear plane of the Y2 upper half flange part 96Y2, and its lower half engaged with a recess part 266 provided to a rear plane of the Y2 lower half flange part 119Y2. The cylindrical gasket 260Y1 also has its upper and lower halves attached to the rear planes of the Y1 upper/lower half flange parts 96Y1, 119Y1 in the same manner.

Figure 24:
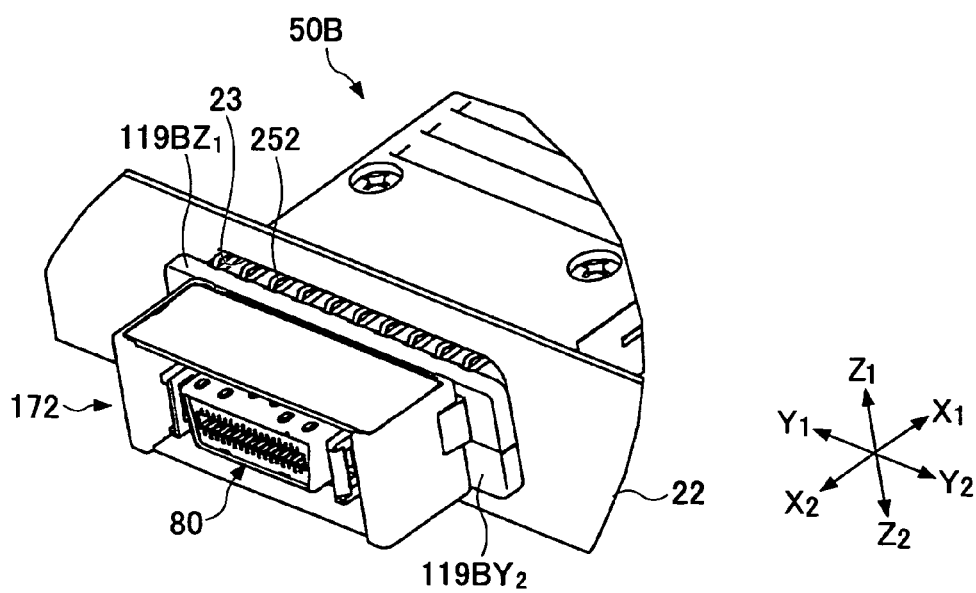
FIG. 24 is a perspective view showing an area of an insertion port of server apparatus having a transceiver module inserted therethrough according to an embodiment of the present invention.
Figure 26:
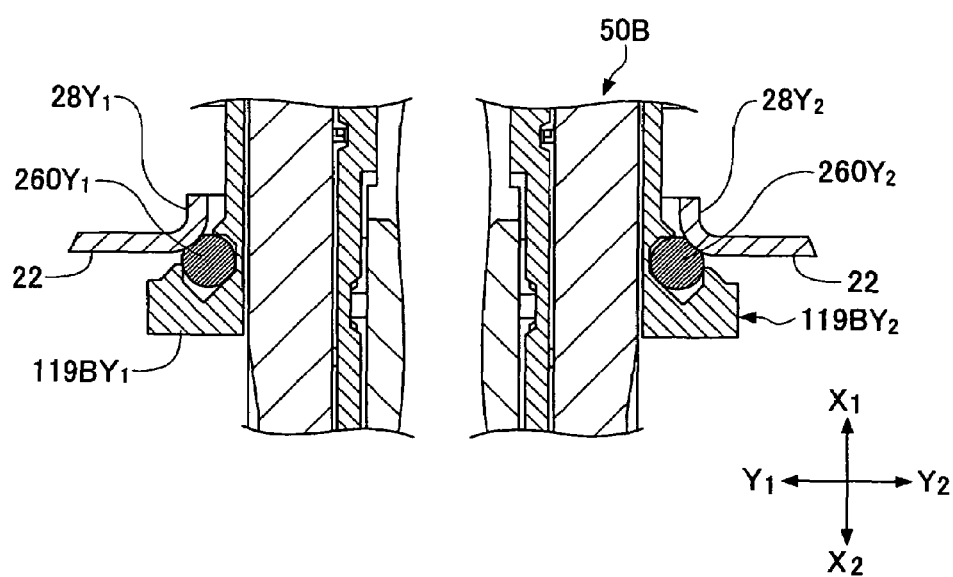
FIG. 26 is a transverse cross-sectional view showing an area of an insertion port of server apparatus having a transceiver module inserted therethrough according to an embodiment of the present invention.

The transceiver module 50B is inserted in the insertion port 23 of the front panel 22 of the server apparatus 20. FIGS. 24, 25, and 26 are drawings for describing the engagement between the transceiver module 50B and the insertion port 23. In FIGS. 25 and 26, the square-shaped insertion port 23 is provided with edge parts 28Z1, 28Z2, 28Y1, and 28Y2 on each side thereof. The edge parts 28Z1, 28Z2, 28Y1, and 28Y2 are bent inward (in the direction toward the server apparatus 20). In mounting the transceiver module 50B, the planar spring parts 252 and the cylindrical gaskets 260Y1, 260Y2 are abut and bend the edge parts 28Z1, 28Z2, 28Y1, and 28Y2. As shown in FIG. 25, the planar spring parts 252 of the gaskets 250Z1 abut the edge parts 28Z1 and the planar spring parts of the gaskets 250Z2 abut the edge parts 28Z2. Accordingly, the areas along the edges of the insertion port 23 can be satisfactorily shielded, and the periphery of the insertion port 23 can be protected from EMI.

Figure 27A:
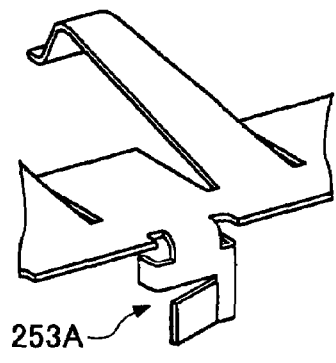
FIGS. 27A-27E are schematic drawings showing modified examples of a latch part of a metal spring-type gasket according to an embodiment of the present invention.
Figure 27C:
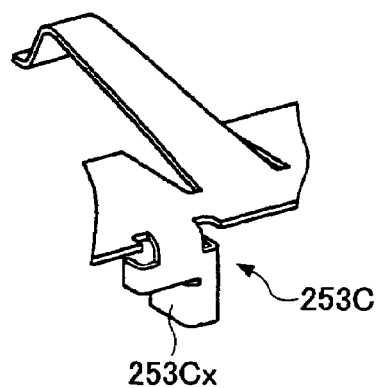
Figure 27B:
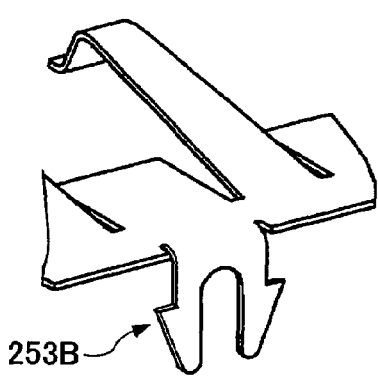
Figure 27D:
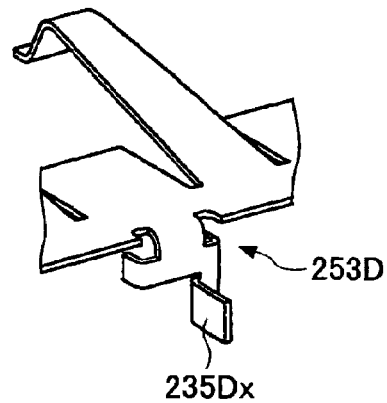
Figure 27E:
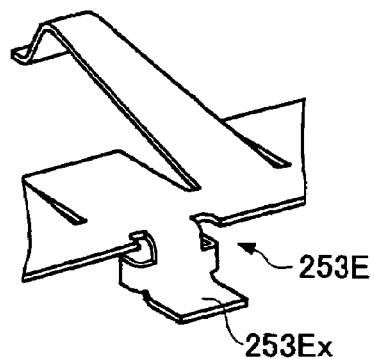

FIGS. 27A-27E show modified examples of the latch part 253. The latch parts 253A, 253B shown in FIGS. 27A, 27B are configured such that the bending restoring force of a portion of the latch parts 253A, 253B causes the portion to abut the rear plane of the upper/lower half housing parts when the latch parts 253A, 253B are inserted in the slits 256 (FIG. 21A). The latch parts 253C, 253D, and 253E are configured such that a portion of the latch parts 253C, 253D, and 253E protruding toward the rear plane of the upper/lower half housing parts are bent to engage with the upper/lower half housing parts when the latch parts 253A, 253B are inserted in the slits 256 (FIG. 21A).

Further, the present invention is not limited to these embodiments, but various variations and modifications may be made without departing from the scope of the present invention.

The present application is based on Japanese Priority Application Nos. 2004-342117 and 2005-147790 filed on Nov. 26, 2004 and May 20, 2005, with the Japanese Patent Office, the entire contents of which are hereby incorporated by reference.

What is claimed is:

1. A transceiver module for mounting to an information processing apparatus, the transceiver module comprising:
    a housing including a cover part provided at a front side of the transceiver module;
    a data transmission/reception part mounted to the housing, the data transmission/reception part including a contact part provided at a rear side of the transceiver module;
    a connector installed in the cover part of the housing; and
    a latch mechanism including:
    an engagement pawl part engaged with the housing, the engagement pawl part including a first cam part;
    a spring member urging from the housing and abutting the engagement pawl part in a first width direction of the transceiver module, and
    a pull sleeve having a second cam part being pressed against the first cam part when the pull sleeve is pulled in a longitudinal direction of the transceiver module;
    wherein the engagement pawl part is configured to move in a second width direction of the transceiver module when the second cam part of the pull sleeve presses against the first cam part of the engagement pawl part.

2. The transceiver module as claimed in claim 1, wherein the first cam part is situated at a part of the engagement pawl part toward the front side of the transceiver module.

3. The transceiver module as claimed in claim 1, wherein the latch mechanism further includes another spring member for returning the pull sleeve to an original position when the pull sleeve is pulled.

4. The transceiver module as claimed in claim 1, wherein the latch mechanism further includes another engagement pawl part having another first cam part, wherein the pull sleeve further includes another second cam part corresponding to the other first cam part, wherein the engagement pawl part and the other engagement pawl part are situated at the side planes of the housing.

5. The transceiver module as claimed in claim 1, wherein the housing further includes a plurality of heat releasing fins that are provided on an upper plane of the housing, and a plurality of connection parts that surround the plural heat releasing fins on the upper plane of the housing.

6. The transceiver module as claimed in claim 1, wherein the pull sleeve includes a pull sleeve part having an inverted U-letter shape and a lower metal plate member situated between the ends of the pull sleeve part.

7. The transceiver module as claimed in claim 1, wherein the housing includes a combination of an upper half housing part and a lower half housing part, wherein the combination is configured to restrict movement of the connector in the housing with respect to the height and longitudinal directions of the transceiver module.

8. The transceiver module as claimed in claim 7, wherein a gasket is provided between an upper plane of the connector and the upper half housing part and between a lower plane of the connector and the lower half housing part.

9. The transceiver module as claimed in claim 7, wherein a heat releasing sheet is provided between an upper plane of the data transmission/reception part and a lower plane of the upper half housing part, wherein a plurality of projecting parts are provided on the lower plane of the upper half housing part in a manner facing the heat releasing sheet.

10. A transceiver module for mounting to an information processing apparatus, the transceiver module comprising:
    a housing including a cover part provided at a front side of the transceiver module;
    a data transmission/reception part mounted to the housing, the data transmission/reception part including a contact part provided at a rear side of the transceiver module;
    a connector installed in the cover part of the housing; and
    a latch mechanism including a pull sleeve having a rod part and a planar shield member engaged to the rod part;
    wherein the planar shield member has a size corresponding to an opening in the housing for inserting the rod part therethrough, the rod part includes a slit part and a core part provided at a far end of the slit part, the planar shield member includes a projecting part and a notch, and the notch is mounted to the core part by pressing the projecting part into the slit part.

11. The transceiver module as claimed in claim 10, wherein the planar shield member includes a U-shaped planar spring part, wherein the U-shaped planar spring part ius configured to return the pull sleeve to an original position when the pull sleeve is pulled.

12. The transceiver module as claimed in claim 10, wherein a plurality of gaskets are provided on an upper plane and a lower plane of the housing toward the front side of the transceiver module, wherein the plural gaskets are metal spring-type gaskets, wherein the plural gaskets are configured to abut an edge part of an insertion port of the information processing apparatus when the transceiver module is inserted in the insertion port of the information processing apparatus.

13. The transceiver module as claimed in claim 10, wherein a plurality of cylindrical gaskets are provided on the side planes of the housing toward the front side of the transceiver module, wherein the plural gaskets are configured to abut an edge part of an insertionport of the information processing apparatus when the transceiver module is inserted in the insertion port of the information processing apparatus.

* * * * *

UNITED STATES PATENT AND TRADEMARK OFFICE
CERTIFICATE OF CORRECTION

PATENT NO.       : 7,470,139 B2  
APPLICATION NO. : 11/189828  
DATED            : December 30, 2008  
INVENTOR(S)      : Yasuyuki Miki et al.

Page 1 of 1

It is certified that error appears in the above-identified patent and that said Letters Patent is hereby corrected as shown below:

Column 16, Line 48, change "ius" to --is--.

Column 16, Line 63, change "insertionport" to --insertion port--.

Signed and Sealed this

Twenty-fourth Day of March, 2009

JOHN DOLL  
*Acting Director of the United States Patent and Trademark Office*